United States Patent
Ozaki et al.

(10) Patent No.: US 7,882,752 B2
(45) Date of Patent: Feb. 8, 2011

(54) SENSOR-EQUIPPED BEARING FOR WHEEL

(75) Inventors: Takayoshi Ozaki, Iwata (JP); Tomomi Ishikawa, Iwata (JP); Kentarou Nishikawa, Iwata (JP)

(73) Assignee: NTN Corporation, Osaka (JP)

( * ) Notice: Subject to any disclaimer, the term of this patent is extended or adjusted under 35 U.S.C. 154(b) by 7 days.

(21) Appl. No.: 12/086,089

(22) PCT Filed: Dec. 1, 2006

(86) PCT No.: PCT/JP2006/324070

§ 371 (c)(1),
(2), (4) Date: Jun. 5, 2008

(87) PCT Pub. No.: WO2007/066593

PCT Pub. Date: Jun. 14, 2007

(65) Prior Publication Data

US 2009/0038414 A1 Feb. 12, 2009

(30) Foreign Application Priority Data

Dec. 8, 2005 (JP) .............................. 2005-354245
Dec. 13, 2005 (JP) .............................. 2005-358588
Dec. 13, 2005 (JP) .............................. 2005-358589

(51) Int. Cl.
G01L 3/14 (2006.01)
(52) U.S. Cl. .................................. 73/862.322
(58) Field of Classification Search ............. 73/862.322
See application file for complete search history.

(56) References Cited

U.S. PATENT DOCUMENTS 5,129,743 A 7/1992 Faye et al.
5,140,849 A 8/1992 Fujita et al.
5,143,458 A * 9/1992 Alff et al. .................... 384/448

(Continued)

FOREIGN PATENT DOCUMENTS

CN 1455233 A 11/2003

(Continued)

OTHER PUBLICATIONS

International Preliminary Report on Patentability mailed on Nov. 27, 2008 and issued in corresponding International Patent Application No. PCT/JP2006/324070.

(Continued)

*Primary Examiner*—Lisa M Caputo
*Assistant Examiner*—Octavia Davis

(57) ABSTRACT

The wheel support bearing assembly is for rotatably supporting a vehicle wheel relative to an automotive vehicle body, which includes an outer member having an inner periphery formed with a plurality of rows of raceway surfaces, an inner member having raceway surfaces formed therein in face-to-face relation with the raceway surfaces in the outer member, and a plurality of rows of rolling elements interposed between those raceway surfaces, respectively; a sensor unit including a sensor mounting member and a strain sensor fitted to the sensor mounting member, the sensor unit being fitted to a stationary member, which is one of the outer member and the inner member; and wherein the sensor mounting member includes at least two contact fixing portion relative to the stationary member and the strain sensor is arranged at at least one location between the contact fixing portions.

10 Claims, 23 Drawing Sheets

U.S. PATENT DOCUMENTS

| | | | |
|---|---|---|---|
| 5,385,411 A * | 1/1995 | Shirai et al. | 384/446 |
| 6,715,926 B2 * | 4/2004 | Tajima et al. | 384/544 |
| 6,802,208 B2 | 10/2004 | Chinitz et al. | |
| 7,108,427 B2 * | 9/2006 | Joki et al. | 384/448 |
| 7,197,944 B2 * | 4/2007 | Koyagi et al. | 73/862.322 |
| 7,212,927 B2 | 5/2007 | Yanagisawa et al. | |
| 7,320,257 B2 * | 1/2008 | Takizawa et al. | 73/862.541 |
| 7,452,133 B2 * | 11/2008 | Ohtsuki et al. | 384/448 |
| 2002/0097040 A1 | 7/2002 | Takizawa et al. | |
| 2003/0218548 A1 | 11/2003 | Sato et al. | |
| 2005/0016296 A1 | 1/2005 | Inoue | |
| 2005/0222740 A1 | 10/2005 | Inoue et al. | |
| 2007/0014500 A1 | 1/2007 | Iwamoto et al. | |
| 2008/0285901 A1 | 11/2008 | Koike et al. | |
| 2009/0080822 A1 | 3/2009 | Ozaki et al. | |
| 2009/0097791 A1 | 4/2009 | Ozaki et al. | |
| 2009/0114004 A1 | 5/2009 | Ozaki et al. | |
| 2009/0120184 A1 | 5/2009 | Ozaki et al. | |
| 2009/0324152 A1 | 12/2009 | Ozaki et al. | |

FOREIGN PATENT DOCUMENTS

| | | |
|---|---|---|
| JP | 2531492 | 1/1997 |
| JP | 2002-340922 | 11/2002 |
| JP | 2003-530565 | 10/2003 |
| JP | 2003-336653 | 11/2003 |
| JP | 2004-3601 | 1/2004 |
| JP | 2004-155261 | 6/2004 |
| JP | 2004-198247 | 7/2004 |
| JP | 2004-360782 | 12/2004 |
| JP | 2005-265175 | 9/2005 |
| JP | 2006-003268 | 1/2006 |
| JP | 2006-010477 | 1/2006 |
| JP | 2006-077807 | 3/2006 |
| JP | 2007-071280 | 3/2007 |
| WO | 01/77634 A2 | 10/2001 |
| WO | 2004/018273 A1 | 3/2004 |

OTHER PUBLICATIONS

International Search Report mailed Jan. 9, 2007 in connection with International Application No. PCT/JP2006/324070.
U.S. Appl. No. 11/991,480, filed Mar. 5, 2008, Ozaki et al.
U.S. Appl. No. 12/086,153, filed Jan. 6, 2008, Ozaki et al.
U.S. Appl. No. 12/224,846, filed Sep. 8, 2008, Ozaki et al.
Office Action dated May 7, 2010 in co-pending U.S. Appl. No. 12/224,846.
U.S. Notice of Allowance mailed Aug. 25, 2010 and issued in related U.S. Appl. No. 12/224,846.

* cited by examiner

SENSOR-EQUIPPED BEARING FOR WHEEL

CROSS REFERENCE TO RELATED PATENT APPLICATIONS

This application claims the benefit under 35 U.S.C. Section 371, of PCT International Application No. PCT/JP2006/324070, filed Dec. 1, 2006, which claimed priority to Japanese Application No. 2005-354245 filed Dec. 8, 2005, Japanese Application No. 2005-358588 filed Dec. 13, 2005, and Japanese Application No. 2005-358589 filed Dec. 13, 2005 in Japan, the contents of which are incorporated herein by reference.

BACKGROUND OF THE INVENTION

The present invention relates to a sensor equipped wheel support bearing assembly having incorporated therein a sensor for detecting a load imposed on a bearing area of a vehicle wheel.

For safety travel of an automotive vehicle, the wheel support bearing assembly equipped with a sensor for detecting the rotational speed of one of automotive wheels has hitherto been well known in the art. While the automobile traveling safety precaution is hitherto generally taken by detecting the rotational speed of a wheel of various parts, it is not sufficient with only the rotational speed of the wheel and, therefore, it is required to achieve a control for safety purpose with the use of other sensor signals.

In view of this, it may be contemplated to achieve an attitude control based on a load acting on each of wheels during travel of an automotive vehicle. By way of example, a large load acts on the outside wheels during the cornering, on the wheels on one side during the run along left and right inclined road surfaces or on the front wheels during the braking, and, thus, a varying load acts on the vehicle wheels. Also, even in the case of the uneven live load, the loads acting on those wheel tend to become uneven. For this reason, if the loads acting on the wheels can be detected as needed, suspension systems for the vehicle wheels can be controlled beforehand based on results of detection of the loads, so that the attitude control of the automotive vehicle during the traveling thereof (for example, prevention of a rolling motion during the cornering, prevention of the front wheel diving during the braking, and prevention of the vehicle wheels diving brought about by an uneven distribution of live loads) can be accomplished. However, no space for installation of the load sensor for detecting the load acting on the respective vehicle wheel is available and, therefore, the attitude control through the detection of the load can hardly be realized.

Also, in the event in the near future the steer-by-wire is introduced and the system, in which the wheel axle and the steering come not to be coupled mechanically with each other, is increasingly used, information on the road surface comes to be required to transmit to the steering wheel hold by a driver by detecting a wheel axle direction load.

In order to meet those needs hitherto recognized, the wheel support bearing assembly has come to be suggested, in which a strain gauge is applied to an outer ring of the wheel support bearing assembly so as to detect the strain. (See, for example, the Japanese Laid-open International Application No. 2003-530565).

SUMMARY OF THE INVENTION

The outer ring of the wheel support bearing assembly is a bearing component part, which has raceway surfaces and is required to have a strength and which is manufactured through complicated process steps including, for example, plastic forming, turning, heat treatment and grinding. For this reason, where the strain gauge is fitted to the outer ring such as disclosed in the above mentioned published patent document, there are problems in that the productivity is low and the cost at the time of mass-production is high.

An object of the present invention is to provide a wheel support bearing assembly, in which a load detecting sensor can be installed neatly and snugly, the load imposed on the vehicle wheel can be detected, and the cost at the time of mass-production is low.

The sensor equipped wheel support bearing assembly according to the first aspect of the present invention is a wheel support bearing assembly for rotatably supporting a vehicle wheel relative to a vehicle body structure, which includes an outer member having an inner periphery formed with a plurality of rows of raceway surfaces, an inner member having raceway surfaces formed therein in face-to-face relation with the raceway surfaces in the outer member, and a plurality of rows of rolling elements interposed between those raceway surfaces, respectively; a sensor unit comprising a sensor mounting member and a strain sensor or a displacement sensor fitted to the sensor mounting member, or a mounting member made of a magnetostrictive material and a detecting coil fitted to the mounting member, the sensor unit being fitted to a stationary member, which is one of the outer member and the inner member; and wherein the sensor mounting member or the mounting member made of the magnetostrictive material includes at least two contact fixing portion relative to the stationary member and the strain sensor, the displacement sensor or the detecting coil is arranged at at least one location between the contact fixing portions. For example, when the outer member is the stationary member and the inner member is the rotatable member, the sensor unit is fitted to the outer member.

Where the sensor unit includes the strain sensor, the stationary member is deformed through the rolling elements when the load acts on the rotatable member as the automotive vehicle runs, and such deformation results in a strain in the sensor unit. The strain sensor provided in the sensor unit detects the strain of the sensor unit. If the relation between the strain and the load is determined beforehand by means of a series of experiments and/or simulations, the load or the like on the vehicle wheel can be detected from the output from the strain sensor.

Where the sensor unit includes the displacement sensor, the stationary member displaces through the rolling elements when the load acts on the rotatable member as the automotive vehicle runs, and such displacement is detected by the displacement sensor of the sensor unit. If the relation between the displacement and the load is determined beforehand by means of a series of experiments and/or simulations, the load or the like on the vehicle wheel can be detected from the output from the displacement sensor.

Where the sensor unit includes the detecting coil, the stationary member is deformed through the rolling elements when the load acts on the rotatable member as the automotive vehicle runs, and such deformation results in a strain in the mounting member of the sensor unit. The detecting coil provided in the sensor unit detects the inverse magnetostrictive effect of the mounting member. If the relation between the strain (inverse magnetostrictive effect) and the load is determined beforehand by means of a series of experiments and/or simulations, the load or the like on the vehicle wheel can be detected from the output from the detecting coil.

In other words, the external force acting on the wheel support bearing assembly, or the working force acting between the wheel tire and the road surface, or the amount of preload in the wheel support bearing assembly can be estimated in reference to the output from the strain sensor, the displacement sensor or the detecting coil, respectively. Also, the load so detected or the like can be utilized in vehicle control of the automotive vehicle.

Since this sensor equipped wheel support bearing assembly is such that the strain sensor or the displacement sensor is fitted to the sensor mounting member that is fitted to the stationary member, or the detecting coil is fitted to the mounting member made of the magnetostrictive material and fitted to the stationary member, the load sensor can be snugly and neatly mounted on the automotive vehicle. Since the sensor mounting member or the mounting member made of the magnetostrictive material is a handy component part that can be fitted to the stationary member, the productivity can be rendered to be excellent and the cost can be reduced if the strain sensor or the displacement sensor or the detecting coil is fitted thereto.

Also, since where the sensor unit includes the displacement sensor, the sensor mounting member of the sensor unit has at least two contact fixing portions relative to the stationary member and at least one displacement sensor is arranged between the neighboring contact fixing portions, the deformation in the radial direction occurs at the location of the displacement in the sensor mounting member as a result of deformation of the stationary member and this displacement can be detected by the displacement sensor, making it possible to detect the displacement of the stationary member with high precision.

The sensor equipped wheel support bearing assembly according to the second constriction of the present invention is the sensor equipped wheel support bearing assembly according to the first aspect, in which of vehicle body fitting holes possessed by the stationary member, which is one of the outer member and the inner member, the neighboring two vehicle body fitting holes adjacent a road surface and/or remote from the road surface are spaced a distance corresponding to a phase difference of 80° or more, wherein the sensor unit comprising the sensor mounting member and the strain sensor is fitted between the neighboring two vehicle body fitting holes, and wherein the sensor mounting member has at least one recess between the neighboring contact fixing portions and the strain sensor is arranged in this recess.

The phase difference is 80° or more and the vehicle mounting holes, in which the sensor unit is fitted therebetween, may be the two neighboring vehicle mounting holes adjacent the road surface or the two neighboring vehicle mounting holes remote from the road surface. Also, the phase difference for the neighboring vehicle mounting holes adjacent the road surface and remote from the road surface may be 80° or more.

In general, the wheel support bearing assembly has various component parts of high rigidity in order to secure the performance thereof. Since for this reason, the strain occurring in the stationary member is small, difficulty is often encountered in detecting the working force acting between the wheel tire and the road surface with the sensor unit. In this respect, in the second aspect now under discussion, since the phase difference α between the neighboring two vehicle body fitting holes adjacent the road surface and/or remote from the road surface, out from the vehicle body fitting holes formed in the stationary member, is so chosen as to be 80° or more and the sensor unit is fitted in position between those two neighboring vehicle body fitting holes spaced a distance corresponding to such phase difference of 80° or more, the strain of the sensor mounting member is so considerable that even the slightest strain occurring in the stationary member can be detected with the sensor unit.

Also, since the sensor mounting member of the sensor unit has the at least two contact fixing portions relative to the stationary member and at least one recess is formed at a location intermediate between the neighboring contact fixing portions with the strain sensor arranged in this recess, the location where the strain sensor of the sensor mounting member is arranged, when the rigidity thereof is lowered, accompanies a more considerable strain than that in the stationary member and the strain in the stationary member can be detected with high precision.

The sensor equipped wheel support bearing assembly according to the third aspect is the sensor equipped wheel support bearing assembly according to the second aspect, in which the stationary member is the outer member.

The sensor equipped wheel support bearing assembly according to the fourth aspect is the sensor equipped wheel support bearing assembly according to the first aspect, in which the sensor unit comprises the mounting member made of the magnetostrictive material and the detecting coil, and wherein the mounting member has at least one recess between the neighboring contact fixing portions and the detecting coil is arranged in this recess.

The mounting member of the sensor unit includes at least two contact fixing portions relative to the stationary member and at least one recess at a location intermediate between the neighboring contact fixing portions, with the detecting coil arranged in such recess. Accordingly, the location where the detecting coil of the sensor mounting member is arranged, as the rigidity thereof is lowered, accompanies a more considerable strain than that in the stationary member and the strain in the stationary member can be detected with high precision.

The sensor equipped wheel support bearing assembly according to the fifth aspect is the sensor equipped wheel support bearing assembly according to the fourth aspect, in which the stationary member is the outer member.

In the fourth aspect, a first one of the contact fixing portions of the sensor mounting member is preferably fitted at a location where it is deformed in a radial direction more than that at any other location of the stationary member by an external force acting on the stationary member or a working force acting between a wheel tire and the road surface. This is rendered to be the sensor equipped wheel support bearing assembly according to the sixth aspect.

In the stationary member, the extent to which the deformation takes place in the radial direction under the influence of the external force and/or the working force varies from place to place in the circumferential direction thereof. According to the result of analysis, the deformation of the stationary member in the radial direction under the influence of an axial force acting at the point of contact between the wheel tire and the road surface is at maximum at the zenith position, which is remote from the road surface, and at the right below position opposite to the zenith position, which is adjacent the road surface. If the first contact fixing portion is fitted to a location of the stationary member, where more considerable deformation in the radial direction occurs than that at any other remaining location of the stationary member, the mounting member will be such that the first contact fixing portion undergoes a considerable deformation accompanied by the considerable deformation of the stationary member with the second contact fixing portion accompanying less deformation providing the fulcrum. Because of this, a more considerable strain will occur at the mounting portion of the mounting member, where the detecting coil is mounted, and the strain of the stationary member can be detected by the detecting coil with higher sensitivity.

In the sixth aspect, a second one of the contact fixing portion may be rendered to be a location where a direction of a radial strain caused by the external force acting on the stationary member or the working force acting between the wheel tire and the road surface is different oppositely. This is rendered to be the sensor equipped wheel support bearing assembly according to the seventh aspect.

If the second contact fixing portion and the first contact fixing portion are rendered to be different locations in positive or negative sign as to the strain of the stationary member in the radial direction, respective strains in those directions are summed together and the deformation of the stationary member can be well transmitted to the mounting member and, therefore, a further increased strain can be detected to allow the strain of the stationary member to be detected with high sensitivity.

The sensor equipped wheel support bearing assembly of the present invention according to the eighth aspect is such that in the sensor equipped wheel support bearing assembly according to the first aspect, the sensor unit comprises the sensor mounting member and the displacement sensor, and the contact fixing portions are fitted to respective locations, which is not deformed in the radial direction, as compared with at any other location of the stationary member, by the external force acting on the stationary member or the working force acting between the wheel tire and the road surface. Also, in this aspect, the displacement sensor is preferably fitted to a location, which is deformed in the radial direction, as compared with at any other location of the stationary member, by the external force acting on the stationary member or the working force acting between the wheel tire and the road surface. This is rendered to be the sensor equipped wheel support bearing assembly according to the ninth aspect.

In the stationary member, the extent to which the deformation takes place in the radial direction under the influence of the external force and/or the working force varies from place to place in the circumferential direction thereof. According to the result of analysis, the deformation of the stationary member in the radial direction under the influence of an axial force acting at the point of contact between the wheel tire and the road surface is at maximum at the zenith position, which is remote from the road surface, and at the right below position opposite to the zenith position, which is adjacent the road surface. If the contact fixing portion of the sensor mounting member is fitted to a location of the stationary member, where no deformation in the radial direction occurs as compared with any other remaining location of the stationary member and the displacement sensor is fitted to a location, where it deforms in the radial direction as compared with that at any other remaining location of the stationary member, the mounting portion of the sensor mounting member, where the displacement sensor is mounted, will deform considerably in the radial direction accompanying the deformation of the stationary member and the displacement of the stationary member can be detected by the displacement sensor with further high sensitivity.

The sensor equipped wheel support bearing assembly according to the tenth aspect is the sensor equipped wheel support bearing assembly according to the eighth aspect, in which the stationary member is the outer member.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF THE PREFERRED EMBODIMENTS

Figure 1:
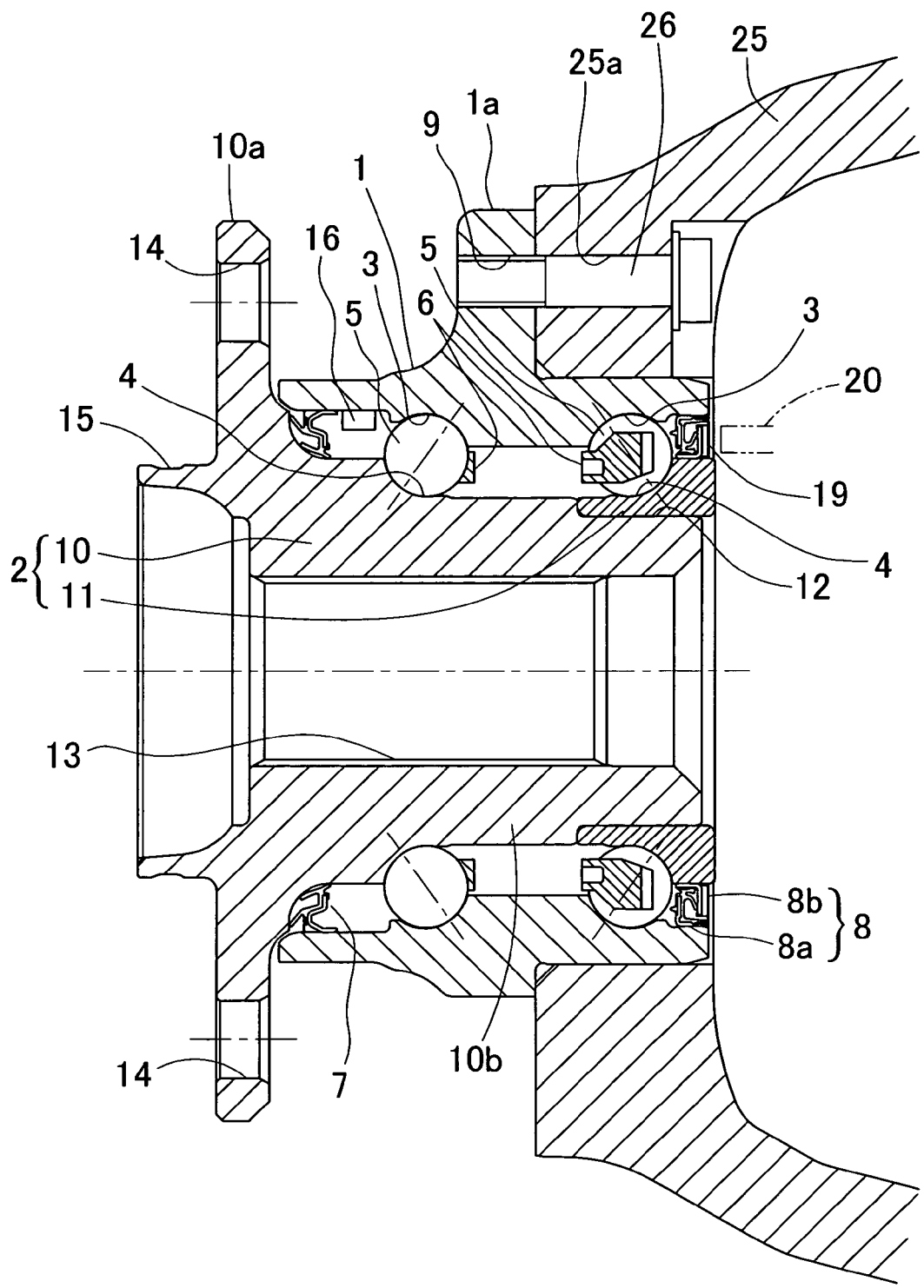
FIG. 1 is a longitudinal sectional view of a sensor equipped wheel support bearing assembly according to a first preferred embodiment of the present invention.
Figure 2:
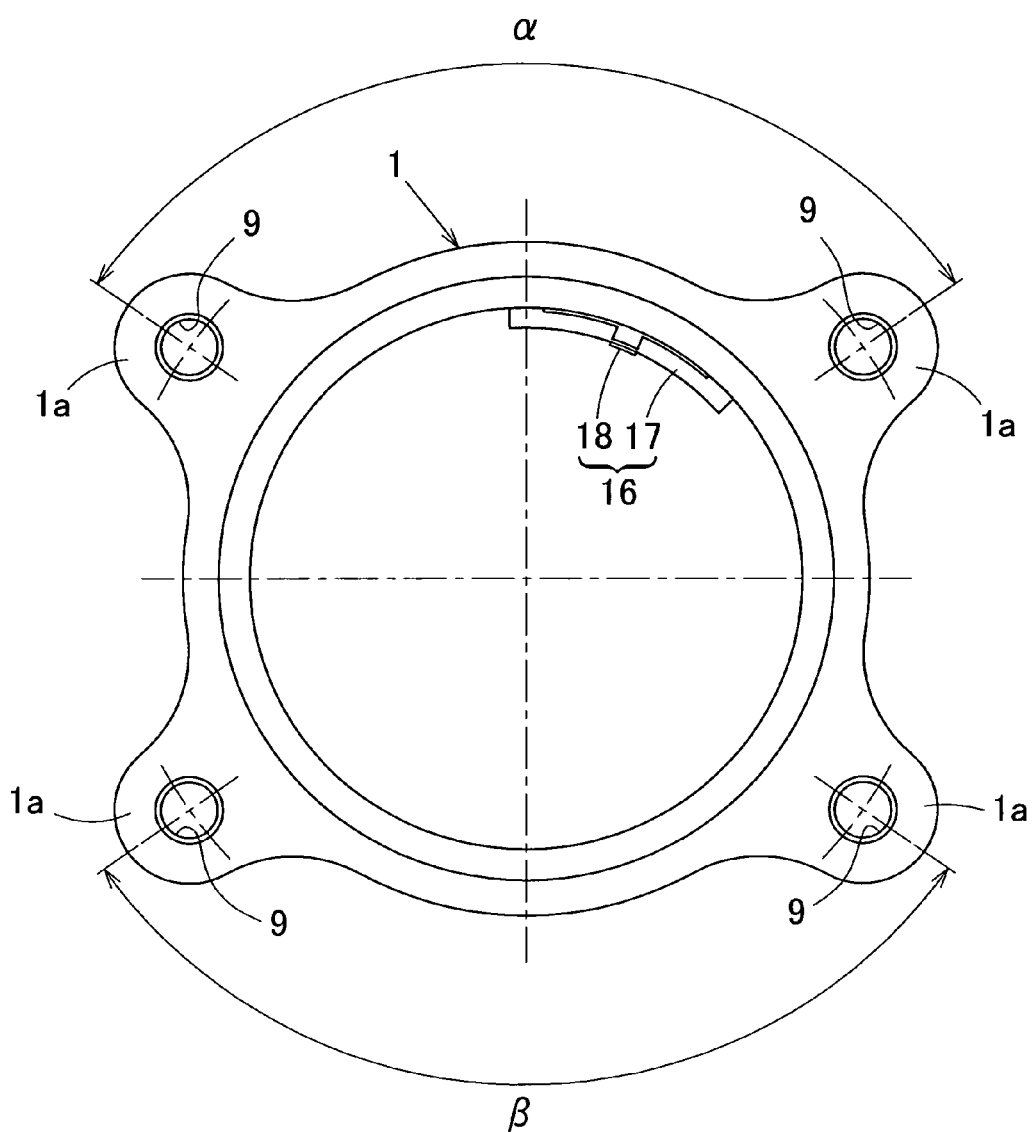
FIG. 2 is a front elevational view of an outer member employed in the wheel support bearing assembly, as viewed from the outboard side.

The first preferred embodiment of the present invention will now be described with particular reference to FIGS. 1 to 3. This embodiment is applied to a wheel support bearing assembly for rotatably supporting a vehicle drive wheel, which is an inner ring rotating model of a third generation type. It is to be noted that in the specification herein set forth, the term "outboard" is intended to means one side of an automotive vehicle body away from the longitudinal center of the automotive vehicle body, whereas the term "inboard" is intended to means the opposite side of the automotive vehicle body close towards the longitudinal center of the automotive vehicle body.

The illustrated wheel support bearing device includes an outer member 1 having an inner periphery formed with a plurality of rows of raceway surfaces 3, an inner member 2 having raceway surfaces 4 formed in face-to-face relation with those raceway surfaces 3, and a plurality of rows of rolling elements 5 interposed between the raceway surfaces 3 in the outer member 1 and the raceway surfaces 4 in the inner member 2. The wheel support bearing device is rendered to be of a double row, angular contact ball bearing type, and the rolling elements 5 are employed in the form of a ball and supported by respective retainers 6 one employed for each of the rows of the rolling elements 5. The raceway surfaces 3 and 4 referred to above have an arcuate shape in cross-section and are so formed as to represent respective rolling element contact angles that are held in back-to-back relation with each other. Opposite open ends of an annular bearing space delimited between the outer member 1 and the inner member 2 are sealed respectively by outboard and inboard sealing units 7 and 8.

The outer member 1 serves as a stationary member and is of one-piece construction having an outer periphery formed with a vehicle body fitting flange 1a that is secured to a knuckle 25 forming a part of the automobile suspension system (not shown) mounted on an automotive body structure. The flange 1a is provided with vehicle body fitting holes 9, which are in the form of a screw hole, at respective locations spaced in a direction circumferentially thereof. The outer member 1 as viewed from the outboard side is shown in a front elevational view in FIG. 2. As shown therein, of the vehicle body fitting holes 9, the phase difference α between the neighboring two vehicle body fitting holes 9 remote from the road surface and the phase difference β between the neighboring two vehicle body fitting holes 9 adjacent the road surface are so chosen to be 80° or more. Fixing of the flange 1a to the knuckle 25 is carried out by the use of knuckle bolts 26 each extending through a respective bolt insertion hole 25a in the knuckle 25 and then firmly threaded into an associated vehicle body fitting hole 9. It is to be noted that each of the vehicle body fitting holes 9 in the vehicle body fitting flange 1a may be a simplified bolt insertion hole and the knuckle 25 may be fixedly secured to the vehicle body fitting flange 1a with a nut fastened onto a corresponding knuckle bolt 26.

The inner member 2 serves as a rotatable member and is made up of a hub axle 10 having an outer periphery formed with a wheel mounting hub flange 10a, and an inner ring 11 mounted on an inboard end of an axle portion 10b of the hub axle 10. The raceway surfaces 4 one for each row are formed in the hub axle 10 and the inner ring 11, respectively. The inboard end of the hub axle 10 has its outer periphery provided with an inner ring mounting surface 12 which is radially inwardly stepped to have a small diameter, and the inner ring 11 is mounted on this inner ring mounting surface 12. The hub axle 10 has a center bore 13 defined therein so as to extend therethrough in a direction axially thereof. The hub flange 10a is provided with a plurality of press-fitting holes 14 defined at respective locations circumferentially thereof for receiving corresponding hub bolts (not shown). At a portion of the hub axle 10 adjacent the root of the hub flange 10a, a cylindrical pilot portion 15 for guiding a vehicle wheel and a brake component parts (both not shown) protrudes towards the outboard side.

A sensor unit 16 is mounted on an inner periphery of an outboard end of the outer member 1. The position where this sensor unit 16 is mounted is chosen to be between respective phases of the neighboring two vehicle body fitting holes 9, which are remote from the road surface and which are spaced from each other a distance corresponding to a phase difference α of 80° or more, that is, a position corresponding to a circumferential position sandwiched between the neighboring two vehicle body fitting holes 9, as shown in FIG. 2. The sensor unit 16 includes a sensor mounting member 17 fixed to the inner periphery of the outer member 1 and a strain sensor 18 fitted to the sensor mounting member 17 and operable to measure a strain occurring in the sensor mounting member 17.

Figure 3A:
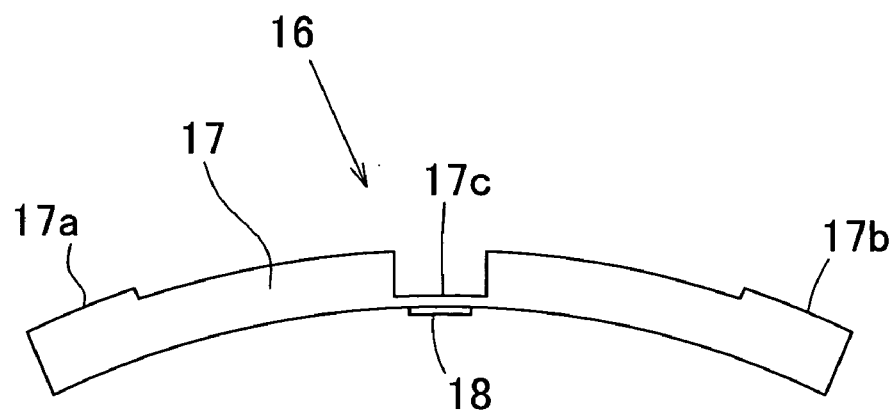
FIG. 3A is a side view of a sensor unit employed in the wheel support bearing assembly.
Figure 3B:
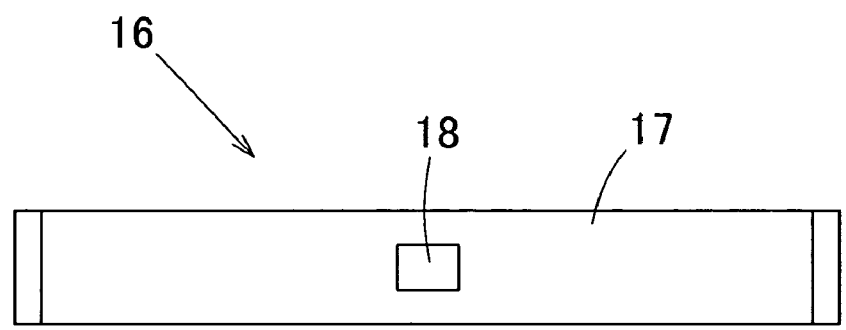
FIG. 3B is a rear view of the sensor unit shown in FIG. 3A.

As shown respectively in side and rear views in FIGS. 3A and 3B, the sensor mounting member 17 is of a generally elongated, arcuate shape extending along the outer member 1 and has opposite ends formed with respective contact fixing portions 17a and 17b of an arcuate shape protruding radially outwardly and, also extending in a circumferential direction.

This sensor mounting member 17 has an intermediate portion formed with a recess 17c open at an outer periphery thereof and a sensor 18 is fitted to a portion of an inner periphery of the sensor mounting member 17 aligned with the recess 17c. For example, the sensor mounting member 17 has a rectangular shape in its cross section, but it may have any suitable shape.

The sensor unit 16 referred to above is fixedly secured to the outer member 1 through the contact fixing portions 17a and 17b in the sensor mounting member 17. Fixing of the contact fixing portions 17a and 17b to the outer member 1 is carried out by the use of bolts or a bonding agent. It is to be noted that a gap is formed between the sensor mounting member 17 and the outer member 1 except for respective portions of the sensor mounting member 17 that are occupied by the contact fixing portions 17a and 17b.

In the case of this embodiment, the sensor unit 16 is so arranged and so positioned that one of the contact fixing portions, for example, the contact fixing portion 17a, can occupy a zenith position right above the longitudinal axis of the outer member 1 whereas the other contact fixing portion 17b occupies a position spaced a few tens degrees from the zenith position in a circumferential direction of the outer member 1. The zenith position lying on the circumference of the outer member 1 is where when an axially acting load is imposed on the outer member 1, the outer member 1 can be most deformed in a radial direction thereof whereas the position circumferentially spaced a few tens degrees from the zenith position is where the outer member 1 can be deformed in the radial direction thereof a quantity smaller than that at the zenith position.

The sensor mounting member 17 is preferably of a kind which does not plastically deform when an external force acting on the wheel support bearing assembly or an working force acting between the wheel tire and the road surface attains the highest expected value. Accordingly, any one of metallic material such as, for example, steel, copper, brass and aluminum can be suitably employed as material for the sensor mounting member 17.

It is to be noted that the inboard sealing unit 8 is made up of a seal element 8a, made of an elastic material such as, for example, rubber, equipped with a core metal fitted to an inner peripheral surface of the outer member 1, and a slinger 8b fitted to an outer peripheral surface of the inner ring 10 and engageable with the seal element 8a, and a magnetic encoder 19 for detecting the rotation, which is in the form of a multi-polar magnet having magnetic poles alternating in a direction circumferentially thereof, is mounted on the slinger 8b. Cooperable with this magnetic encoder 19 is a magnetic sensor 20 that is fitted to the outer member 1 in face-to-face relation with the magnetic encoder 19.

Figure 4:
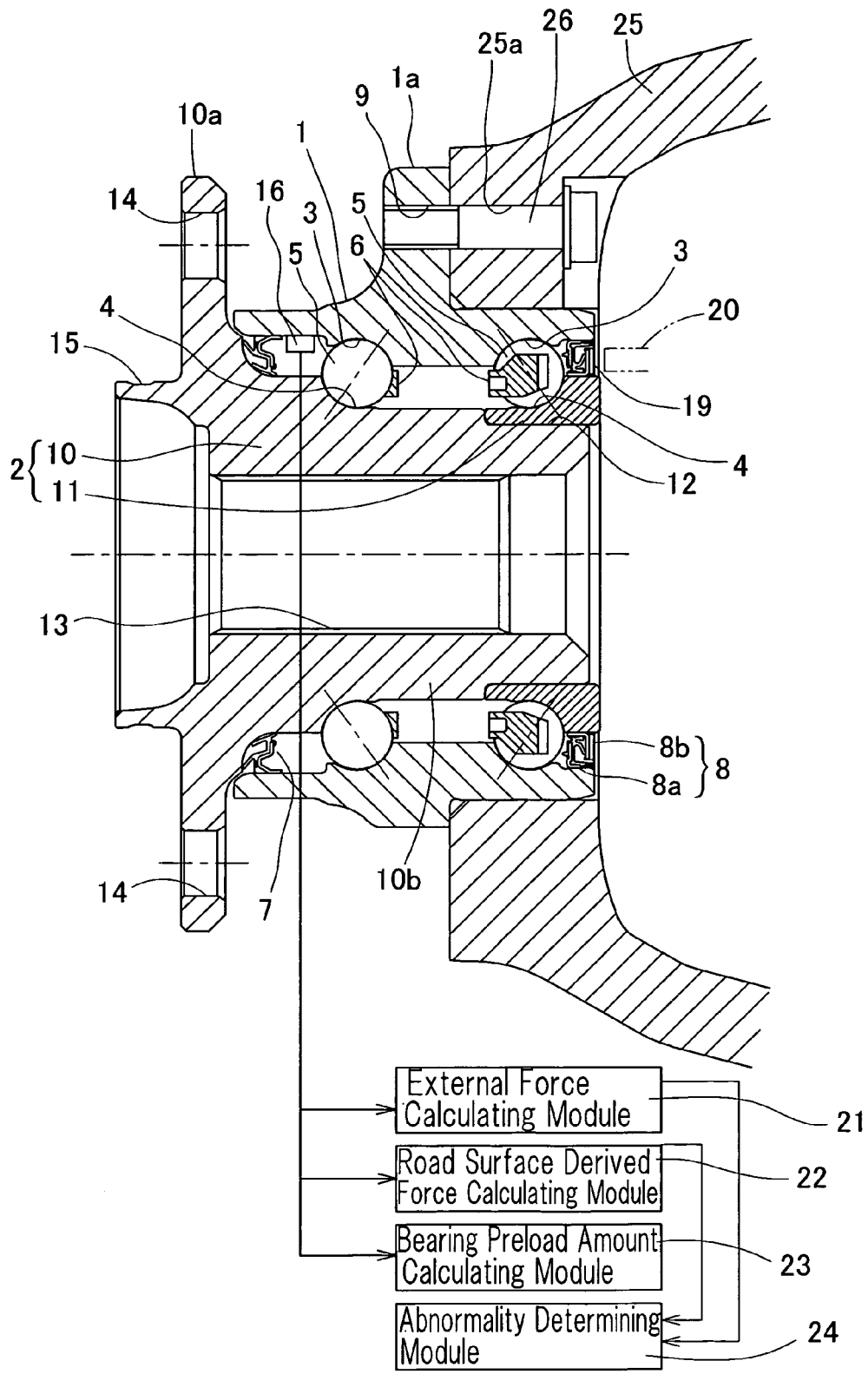
FIG. 4 is a diagram showing a longitudinal sectional view of the wheel support bearing assembly together with a circuit block diagram of a conceptual construction of a detecting system employed therein.

As shown in FIG. 4, as a means for processing an output from the sensor unit 16, a circuit unit is provided, which includes an external force calculating module 21, a road surface derived force calculating module 22, a bearing preload amount calculating module 23 and an abnormality determining module 24. This circuit unit including those modules 21 to 24 may be incorporated in an electronic circuit device (not shown) such as, for example, a circuit substrate fitted to the outer member 1 or the like of the wheel support bearing assembly, or in an electric control unit (ECU) mounted on the automotive vehicle.

The operation of the sensor equipped wheel support bearing assembly of the structure described hereinabove will now be described. When a load is applied to the hub axle 10, the outer member 1 is deformed through the rolling elements 5 and this deformation is transmitted to the sensor mounting member 17 of the sensor unit 16, fitted to the inner periphery of the outer member 1, resulting in a corresponding deformation of the sensor mounting member 17. This strain occurring in the sensor mounting member 17 is measured by the strain sensor 18. At this time, the sensor mounting member 17 deforms accompanying deformation of the fixing portion of the sensor mounting member 17 in the radial direction, but since the sensor mounting member 17 is fitted to the position where it can be most deformed in the radial direction, the strain of the sensor mounting member 17 becomes so considerable that even the slightest strain of the outer member 1, which is the stationary member, can be detected by the sensor unit 16. In addition, since the sensor mounting member 17 is provided with the recess 17c and the rigidity at the position where the recess 17c is formed is lowered, more considerable strain than the strain of the outer member 1 occurs in the sensor mounting member 17 and, accordingly, even the slightest strain of the outer member 1 can be more accurately detected with the strain sensor 18.

In general, the wheel support bearing assembly has various component parts of high rigidity in order to secure the performance thereof. Since for this reason, the strain occurring in the stationary member is small, difficulty is often encountered in detecting the working force acting between the wheel tire and the road surface with the sensor unit 16. In this respect, in the first embodiment now under discussion, since the phase difference α between the neighboring two vehicle body fitting holes 9 adjacent the road surface, out from the vehicle body fitting holes 9 formed in the outer member 1, is so chosen as to be 80° or more and the sensor unit 16 is fitted in position between those two neighboring vehicle body fitting holes 9 that are spaced a distance corresponding to such phase difference of 80° or more, the strain of the sensor mounting member 17 is so considerable that even the slightest strain occurring in the outer member 1 can be detected with the sensor unit 16.

Since of the two contact fixing portions 17a and 17b in the sensor mounting member 17, one contact fixing portion 17a is positioned at the zenith position lying on the entire circumference, where the outer member 1 is most deformed in the radial direction in response to the load acting on the outer member 1, and the other contact fixing portion 17b is held at a position spaced a few tens degrees from the zenith position in the circumferential direction, where the outer member 1 can be deformed in the radial direction thereof a quantity smaller than that at the zenith position, a further considerable strain occurs in a portion of the sensor mounting member 17, where the strain sensor 18 is mounted when the first contact fixing portion 17a undergoes a considerable deformation with the second contact fixing portion 17b providing the fulcrum, and, accordingly, the strain of the outer member 1 can be detected by the strain sensor 18 with high sensitivity.

From the value of strain so detected in the manner described above, it is possible to detect the external force or the like acting on the wheel support bearing assembly. Since change in strain varies depending on the direction and the magnitude of the load, the external force acting on the wheel support bearing assembly or the working force acting between the wheel tire and the road surface can be calculated if the relation between the strain and the load is determined beforehand by means of a series of experiments or simulations. The external force calculating module 21 and the road surface derived force calculating module 22 are operable in response to the output from the strain sensor 18 to calculate the external force acting on the wheel support bearing assembly and the working force acting between the wheel tire and the road surface, respectively, in reference to the relation between the strain and the load so determined beforehand by means of the experiments or simulations.

The abnormality determining module 24 is operable to output an abnormality signal to the outside in the event that the working force acting between the wheel tire and the road surface or the external force acting on the wheel support bearing assembly so calculated is determined as exceeding a predetermined allowance. This abnormality signal can be utilized in vehicle control of the automotive vehicle.

Also, if the external force acting on the wheel support bearing assembly or the working force acting between the wheel tire and the road surface is outputted in real time by the external force calculating module 21 and the road surface derived force calculating module 22, a sophisticated vehicle control can be accomplished.

Also, while the wheel support bearing assembly is applied a preload through the inner ring 11, the sensor mounting member 17 will deform even under the influence of such preload. For this reason, if the relation between the strain and the preload is determined beforehand by means of a series of experiments or simulations, it is possible to ascertain the condition of preload in the wheel support bearing assembly. The bearing preload amount calculating module 23 is operable in response to an output from the strain sensor 18 to output a bearing preload amount in reference to the relation between the strain and the preload so determined beforehand by means of the experiments or simulations. Also, if the preload amount outputted from the bearing preload amount calculating module 23 is utilized, adjustment of the preload during assemblage of the wheel support bearing assembly can be facilitated.

In the foregoing first embodiment, although the sensor unit 16 is disposed on that portion of the inner periphery of the outer member 1, where the neighboring vehicle body fitting holes 9 in the outer member 1 remote from the road surface are spaced from each other a distance corresponding to the phase difference α, the sensor unit 16 may be disposed on a portion of the inner periphery of the outer member 1, where the neighboring vehicle body fitting holes 9 adjacent the road surface are spaced from each other a distance corresponding to the phase difference β.

Figure 5:
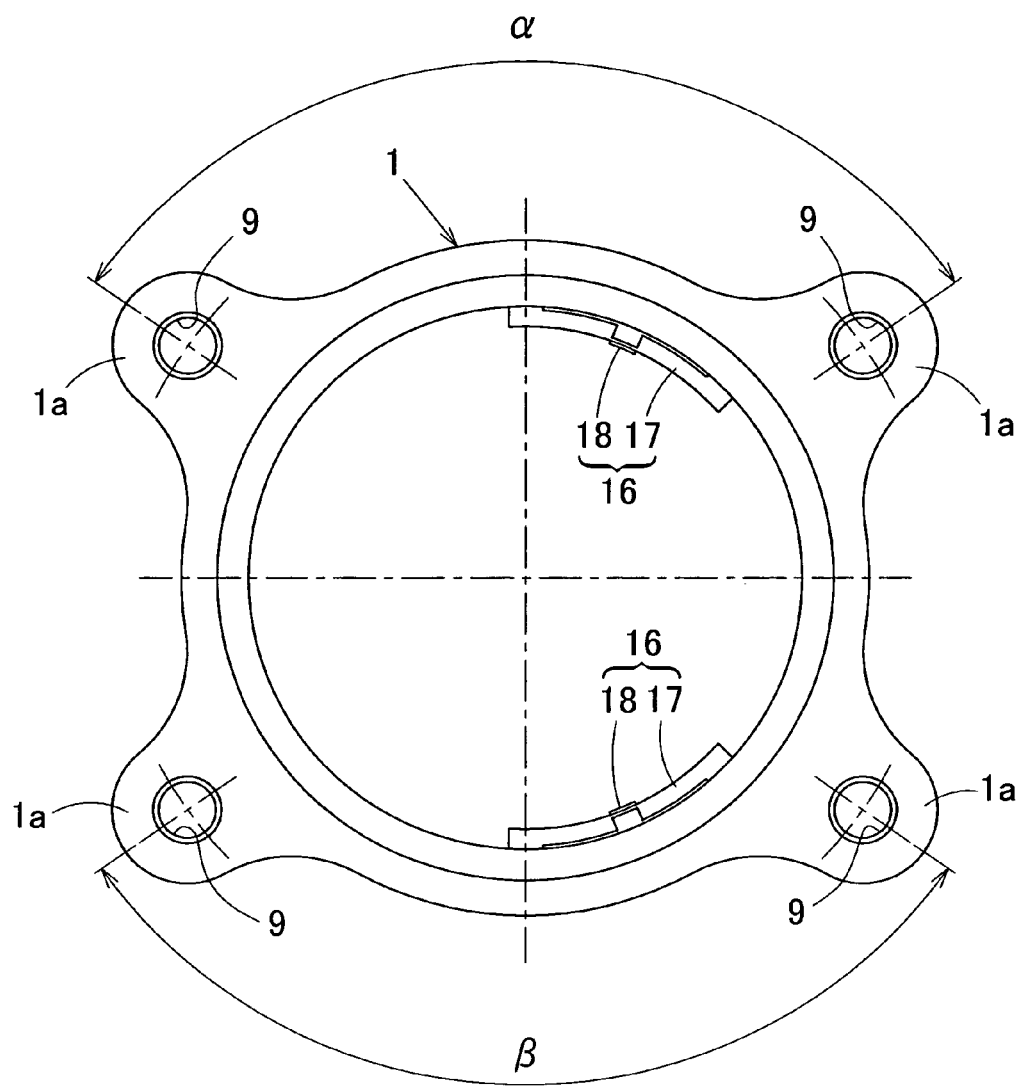
FIG. 5 is a front elevational view showing another arrangement of the sensor unit on the outer member, as viewed from the outboard side.

Also, as shown in FIG. 5, the sensor unit 16 may be disposed on that portion of the inner periphery of the outer member 1, where the neighboring vehicle body fitting holes 9 remote from the road surface are spaced from each other a distance corresponding to the phase difference α and, also, on a portion of the inner periphery of the outer member 1, where the neighboring vehicle body fitting holes 9 adjacent the road surface are spaced from each other a distance corresponding to the phase difference β.

Figure 6:
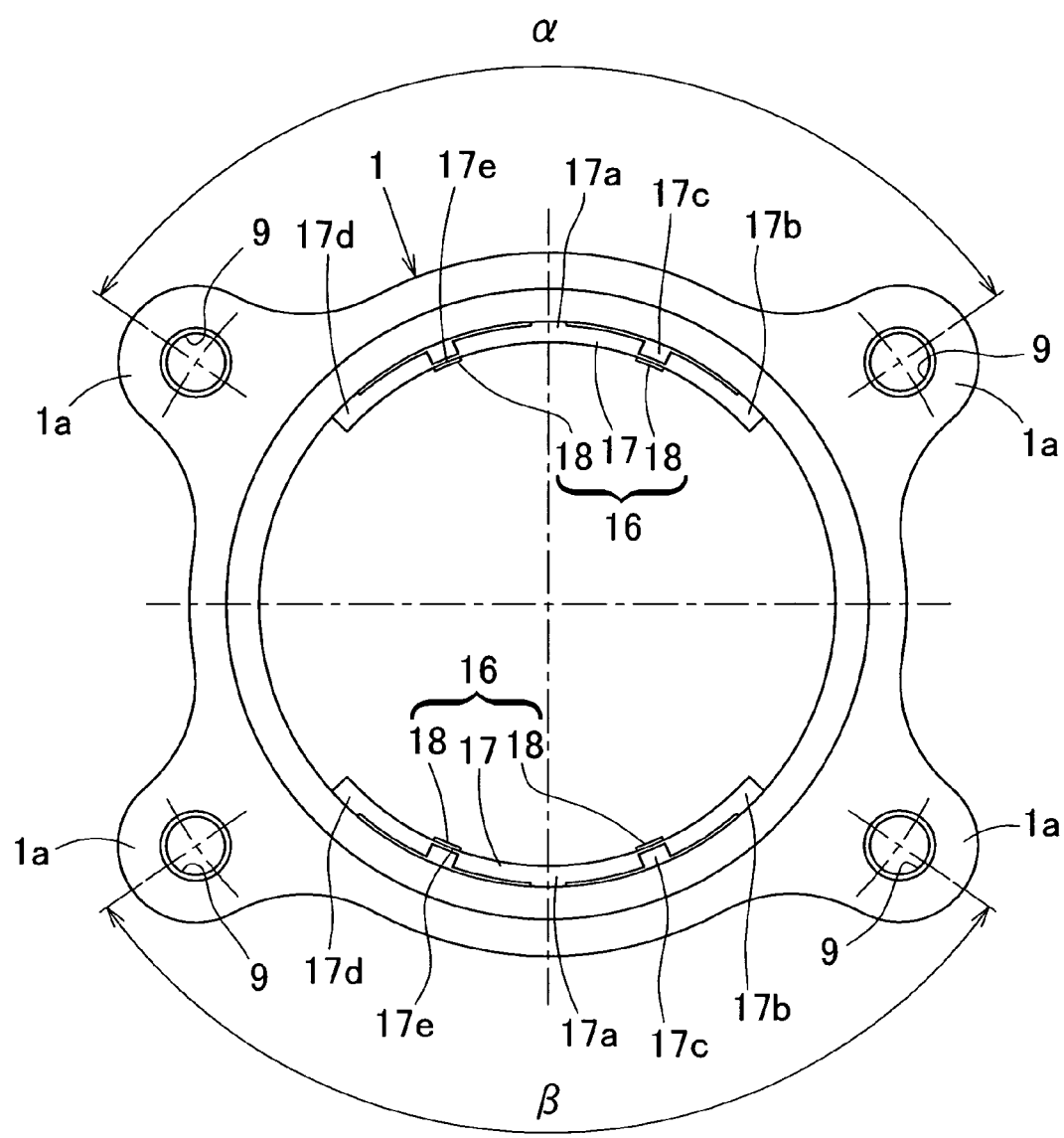
FIG. 6 is a front elevational view showing a different arrangement of the sensor unit on the outer member, as viewed from the outboard side.

Yet, each of the sensor units 16 shown in FIG. 5 may be so structured as to have three contact fixing portions 17a, 17b and 17d and two recesses 17c and 17e one positioned between the neighboring contact fixing portions 17a and 17b and other positioned between the neighboring contact fixing portions 17a and 17d and opening at the outer periphery of the respective sensor units 16 as shown in FIG. 6.

Figure 7:
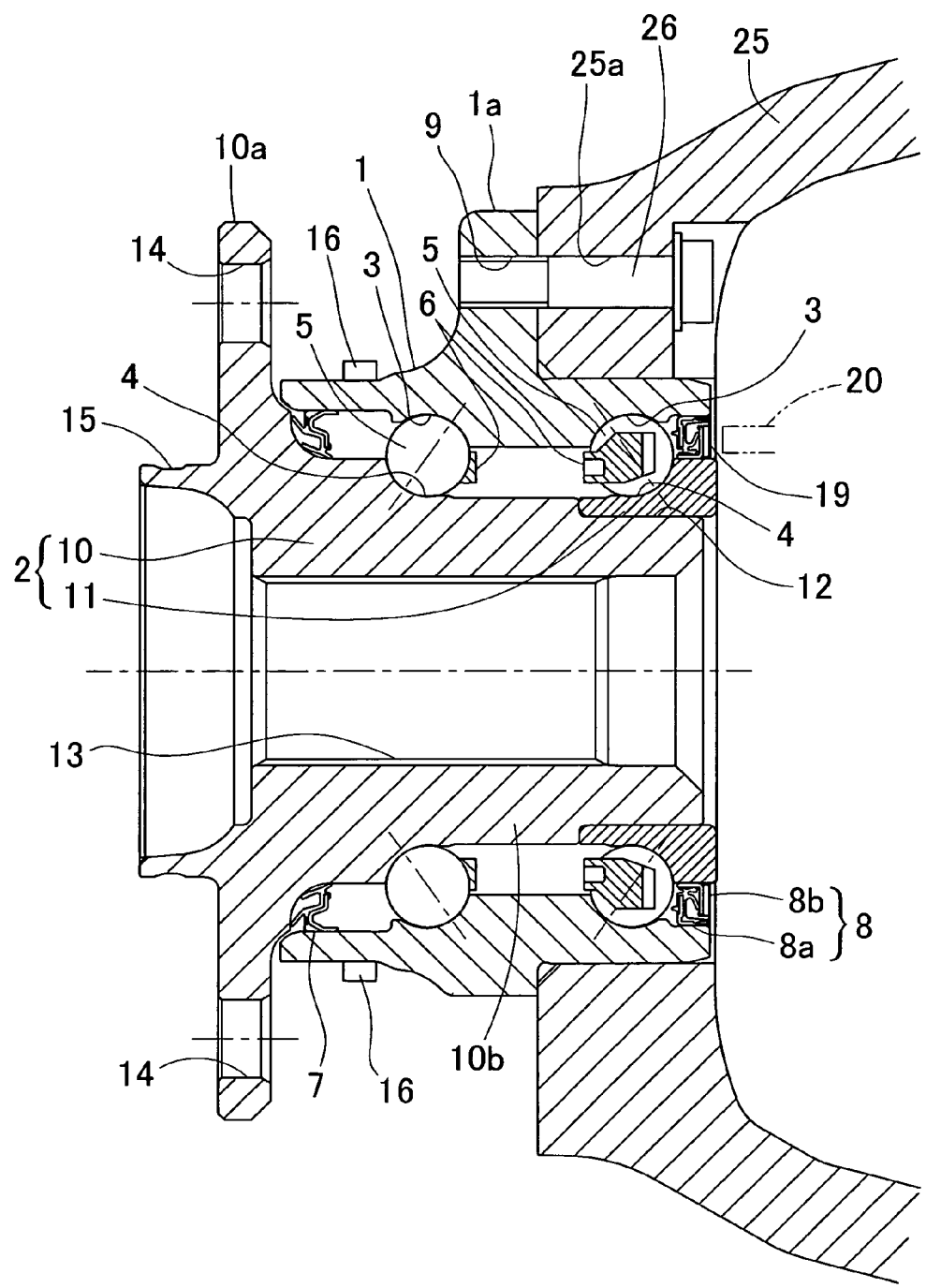
FIG. 7 is a longitudinal sectional view of the sensor equipped wheel support bearing assembly according to a second preferred embodiment of the present invention.
Figure 8:
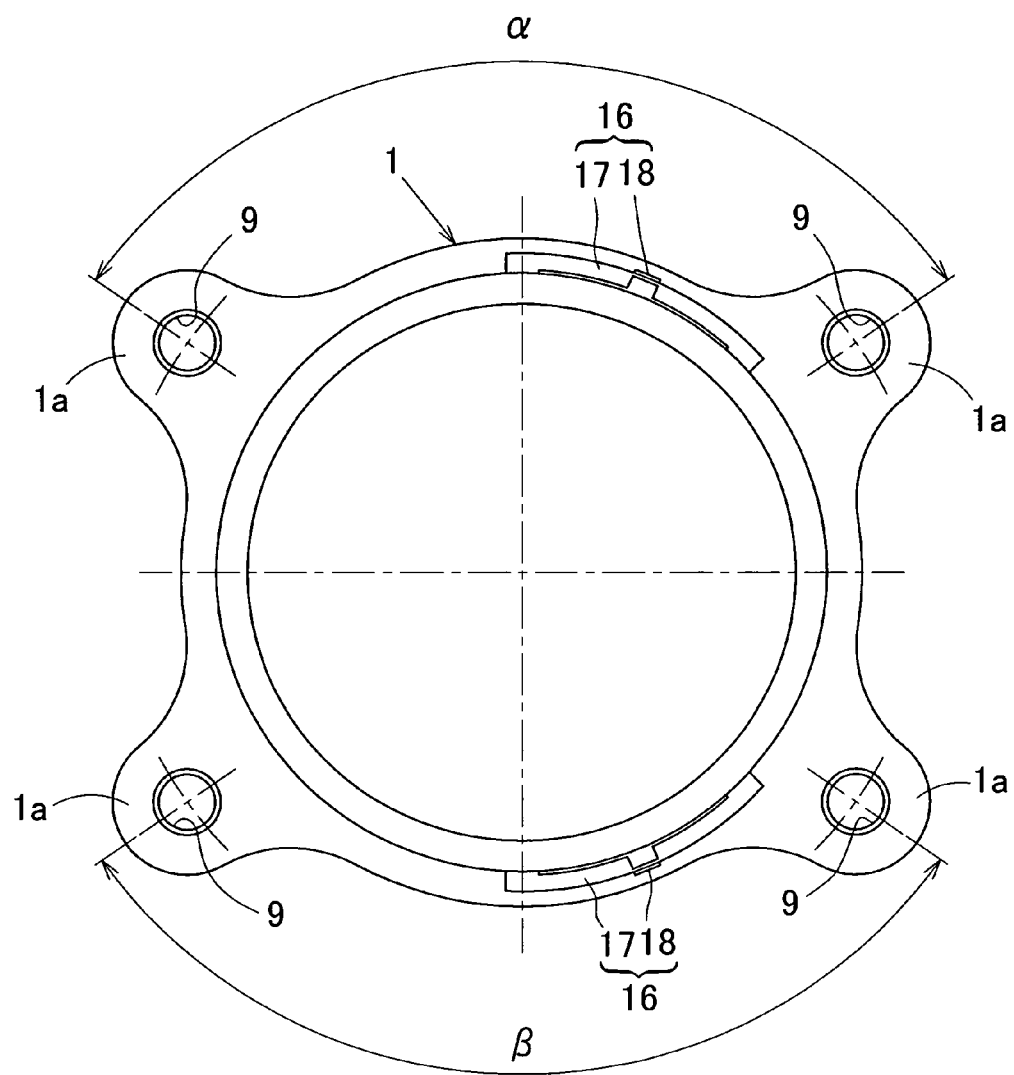
FIG. 8 is a front elevational view showing the outer member employed in the wheel support bearing assembly as viewed from the outboard side.

In addition, each of the sensor unit 16 may be disposed on an outer periphery of the outer member 1 such as shown in a second preferred embodiment in FIGS. 7 and 8. In such case, the contact fixing portions 17a and 17b of the sensor mounting member 17 are of an arcuate shape protruding radially inwardly and, also, extending in a circumferential direction, with the respective recesses 17c opening radially inwardly of the arcuate shape of the sensor mounting member 17.

In any of those first and second embodiments, it is necessary to design and shape the sensor mounting member 17 which does not undergo a plastic deformation even when the maximum expected load is imposed on the wheel support bearing assembly.

Figure 9:
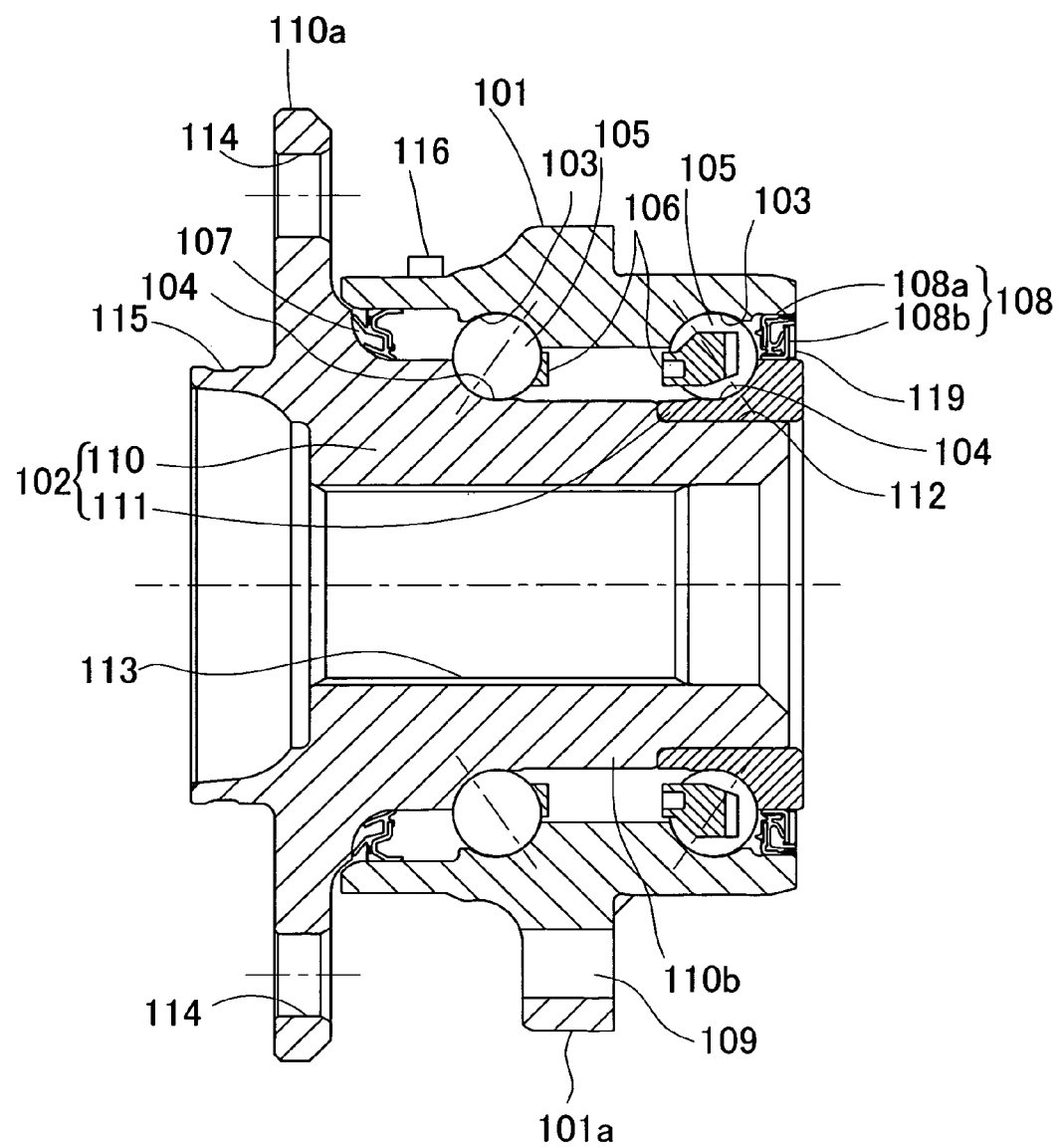
FIG. 9 is a longitudinal sectional view of the sensor equipped wheel support bearing assembly according to a third preferred embodiment of the present invention.
Figure 10:
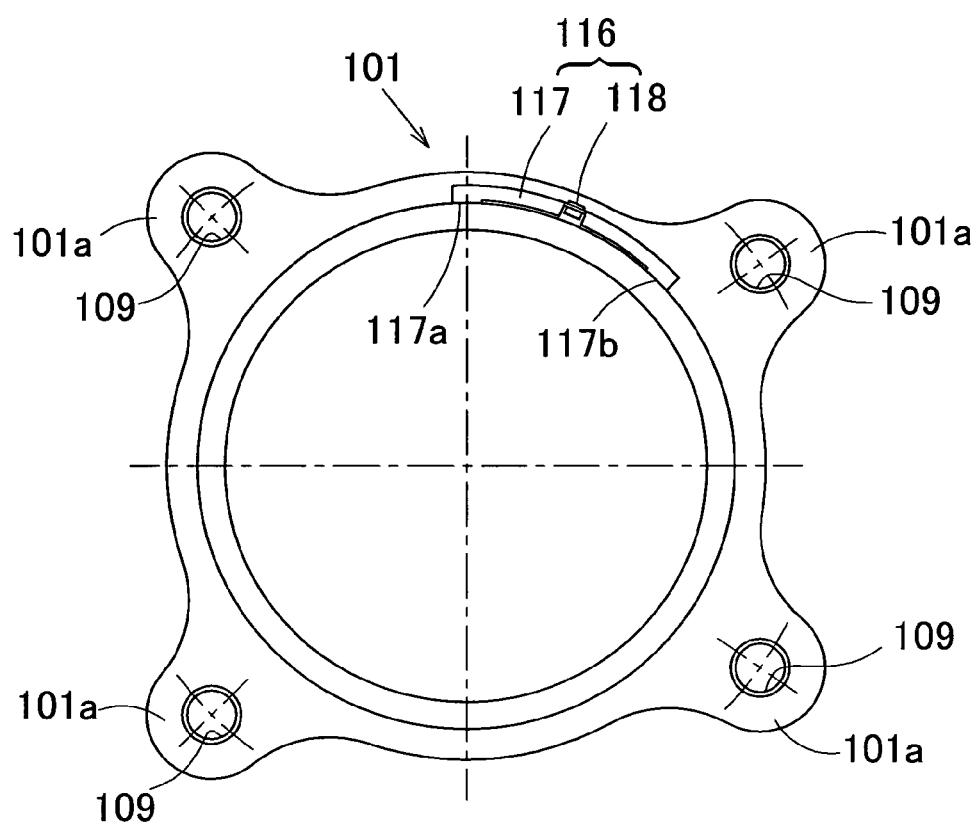
FIG. 10 is a front elevational view of the outer member employed in the wheel support bearing assembly, as viewed from the outboard side.
Figure 11A:
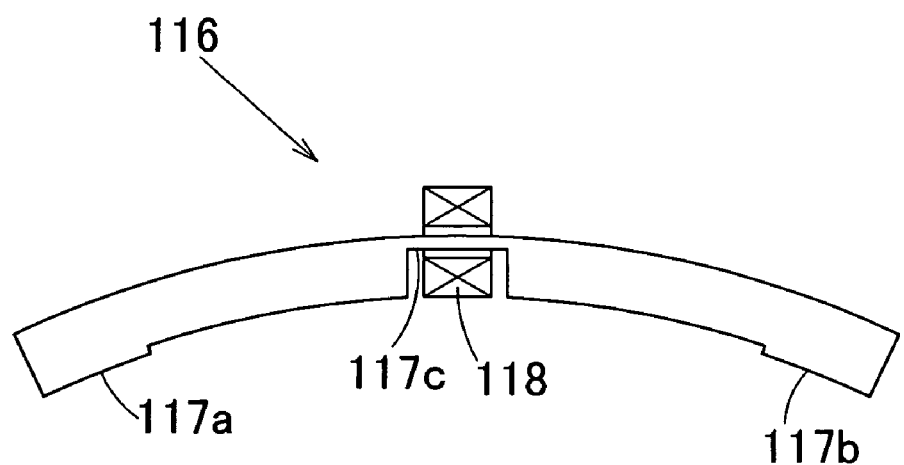
FIG. 11A is a side view of the sensor unit employed in the wheel support bearing assembly.
Figure 11B:
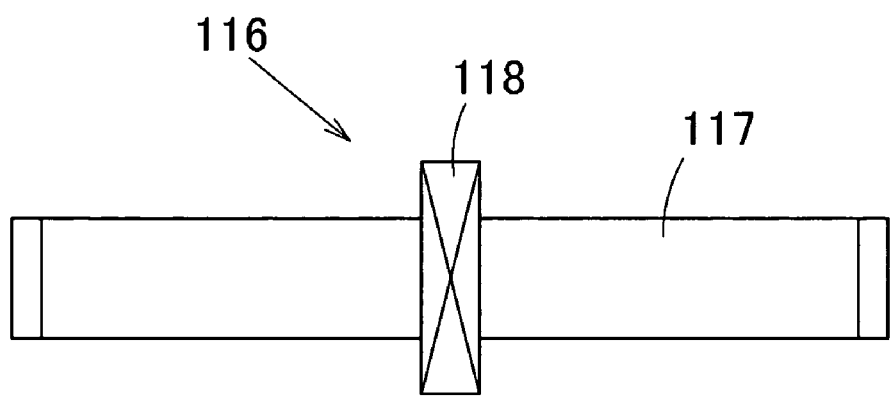
FIG. 11B is a rear view of the sensor unit.

In the following description, a third preferred embodiment of the present invention will be described with particular reference to FIGS. 9 to 11. Even this embodiment is applied to the wheel support bearing assembly for the support of a vehicle drive wheel, which is an inner ring rotating model of a third generation type. It is to be noted that even in this embodiment, one side of an automotive vehicle body away from the longitudinal center of the automotive vehicle body is referred to as "outboard", and the opposite side of the automotive vehicle body close towards the longitudinal center of the automotive vehicle body is referred to as "inboard".

This wheel support bearing assembly includes an outer member 101 having an inner periphery formed with a plurality of rows of raceway surfaces 103, an inner member 102 formed with raceway surfaces 104 held in face-to-face relation with the raceway surfaces 103, and a plurality of rows of rolling elements 105 interposed between the respective raceway surfaces 103 and 104 in the outer member 101 and the inner member 102. The wheel support bearing device is rendered to be of a double row, angular contact ball bearing type, and the rolling elements 105 are employed in the form of a ball and supported by respective retainers 106 one employed for each of the rows of the rolling elements 105. The raceway surfaces 103 and 104 referred to above have an arcuate shape in cross-section and are so formed as to represent respective rolling element contact angles that are held in back-to-back relation with each other. Opposite open ends of an annular bearing space delimited between the outer member 101 and the inner member 102 are sealed respectively by outboard and inboard sealing units 107 and 108.

The outer member 101 serves as a stationary member and is of one-piece construction having an outer periphery formed with a vehicle body fitting flange 101a that is secured to a knuckle forming a part of the automobile suspension system (not shown) mounted on an automotive body structure. The flange 101a is provided with vehicle body fitting holes 109 at respective locations spaced in a direction circumferentially thereof.

The inner member 102 serves as a rotatable member and is made up of a hub axle 110 having an outer periphery formed with a wheel mounting hub flange 110a, and an inner ring 111 mounted on an inboard end of an axle portion 110b of the hub axle 110. The raceway surfaces 104 one for each row are formed in the hub axle 110 and the inner ring 111, respectively. The inboard end of the hub axle 110 has its outer periphery provided with an inner ring mounting surface 112 which is radially inwardly stepped to have a small diameter, and the inner ring 111 is mounted on this inner ring mounting surface 112. The hub axle 110 has a center bore 113 defined therein so as to extend therethrough in a direction axially thereof. The hub flange 110a is provided with a plurality of press-fitting holes 114 defined at respective locations circumferentially thereof for receiving corresponding hub bolts (not shown). At a portion of the hub axle 110 adjacent the root of the hub flange 110a, a cylindrical pilot portion 115 for guiding a vehicle wheel and a brake component parts (both not shown) protrudes towards the outboard side.

A sensor unit 116 is mounted on an inner periphery of an outboard end of the outer member 101. The axial position of the sensor unit 116 is rendered to be on an outboard side of the outboard raceway surface 104 in the outer member 101 and on an inboard side of the outboard sealing unit 107. The outer member 101 as viewed from the outboard side is shown in FIG. 10 in a front elevational view. As shown therein, the sensor unit 116 includes a mounting member 117, made of a magnetostrictive material and fixed on an outer peripheral surface of the outer member 101, and a detecting coil 118 mounted on this mounting member 117 for measuring an inverse magnetostrictive effect of the mounting member 117.

The mounting member 117 is of a shape and made of a material, which does not undergo plastic deformation when fixed. In this third embodiment, the mounting member 117 is, a shown in side and rear views in FIGS. 11A and 11B, respectively, of an elongated, substantially arcuate shape curved to follow the circumference of the outer member 101 and has its opposite ends formed with respective contact fixing portions 117a and 117b protruding in a direction radially inwardly from the arcuate shape and, also, in a laterally widthwise direction. This mounting member 117 has an intermediate portion formed with a recess 117c open at an inner periphery thereof and the detecting coil 118 is wound around and fitted to the recess 117c. For example, the mounting member 117 has a rectangular shape in its cross section, but it may have any suitable shape.

The sensor unit 116 referred to above is fixedly secured to an outer peripheral surface of the outer member 101 through the contact fixing portions 117a and 117b of the mounting member 117, with the lengthwise direction of the mounting member 117 oriented in a direction circumferentially of the outer member 101. Fixing of the contact fixing portions 117a and 117b to the outer member 101 is carried out by the use of bolts or a bonding agent. It is to be noted that a gap is formed between the mounting member 117 and the outer member 101 except for respective portions of the mounting member 117 that are occupied by the contact fixing portions 117a and 117b.

In the case of this third embodiment, the sensor unit 116 is so arranged and so positioned that one of the contact fixing portions, for example, the contact fixing portion 117a, can occupy a zenith position on the circumference of the outer member 101, which is right above the longitudinal axis of the outer member 101, whereas the other contact fixing portion 117b occupies a position spaced a few tens degrees from the zenith position in a circumferential direction of the outer member 101. The zenith position lying on the circumference of the outer member 101 is where when an axially acting load is imposed on the outer member 101, the outer member 101 can be most deformed in a radial direction thereof whereas the position circumferentially spaced a few tens degrees from the zenith position is where the outer member 101 can be deformed in the radial direction thereof a quantity smaller than that at the zenith position.

The mounting member 117 is preferably of a kind which does not plastically deform when an external force acting on the wheel support bearing assembly or a working force acting between the wheel tire and the road surface attains the highest expected value. Once the plastic deformation occurs, deformation of the outer member 101 will not be accurately transmitted to the mounting member 117 and measurement of the inverse magnetostrictive effect will be affected adversely. For the mounting member 117, some materials are available and Ni or the like having a negative magnetostrictive constant can be suitably employed as it can enable measurement with high sensitivity. Also, where the material forming the mounting member 117 is chosen to be the same as that forming the outer member 101, it is possible to minimize influences brought about by temperature on the detecting accuracy.

It is to be noted that the inboard sealing unit 108 includes a sealing member 108a made of an elastic material such as, for example, rubber equipped with a core metal fitted to the inner peripheral surface of the outer member 101, and a slinger 108b fitted to the outer peripheral surface of the inner ring 10 and engageable with the sealing member 108a, and a magnetic encoder 119 for the detection of the rotation, which is in the form of a multipolar magnet having magnetic poles alternating in a direction circumferentially thereof, is provided in the slinger 108a. Cooperable with the magnetic encoder 119 is a magnetic sensor (not shown) mounted on the outer member 101 in face-to-face relation therewith.

Figure 12:
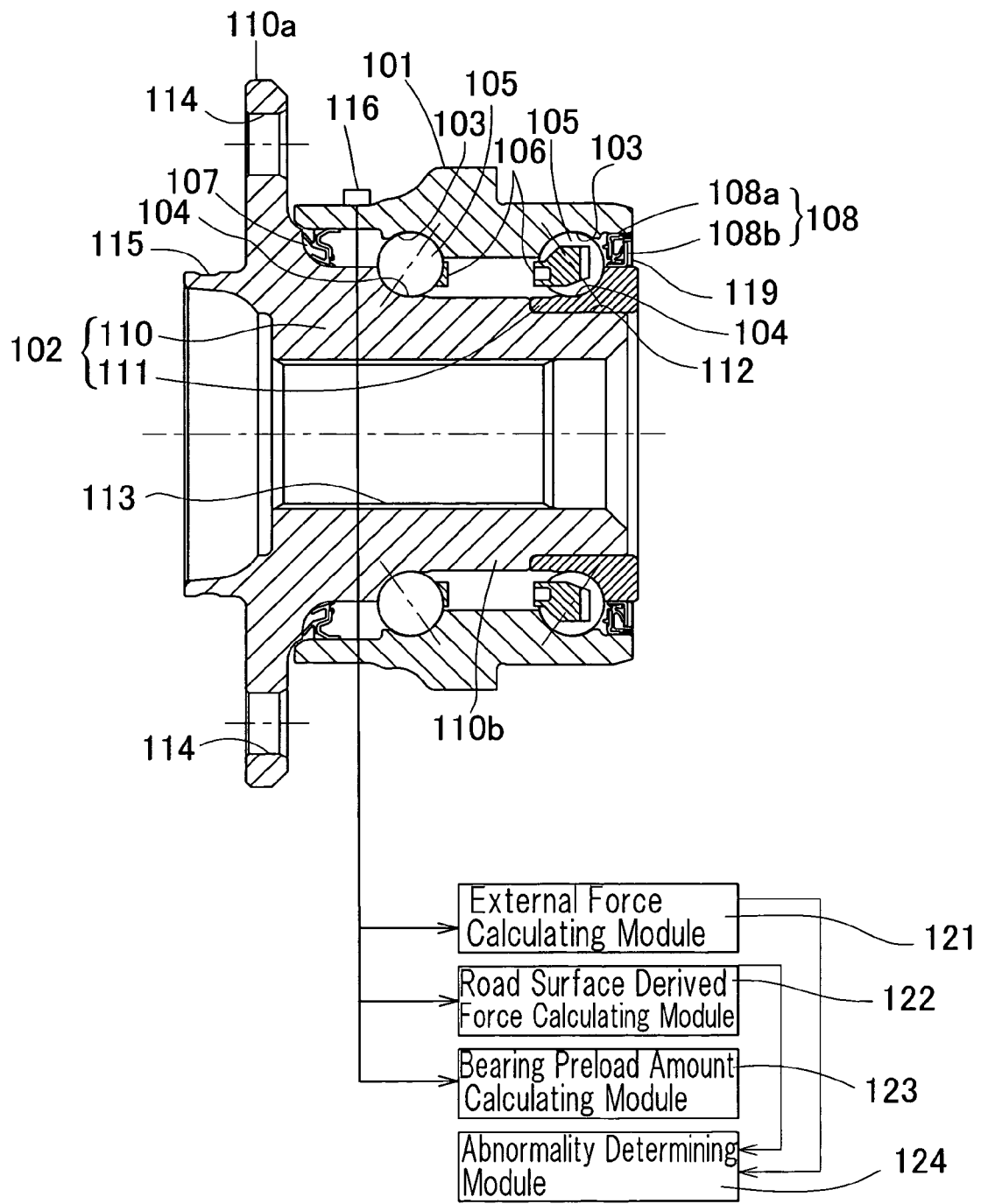
FIG. 12 is an explanatory diagram showing a sectional view of the wheel support bearing assembly together with a circuit block diagram showing a conceptual construction of a detecting system therefor.

As shown in FIG. 12, as a means for processing an output from the sensor unit 116, a circuit unit is provided, which includes an external force calculating module 121, a road surface derived force calculating module 122, a bearing preload amount calculating module 123 and an abnormality determining module 124. This circuit unit including those modules 121 to 124 may be incorporated in an electronic circuit device (not shown) such as, for example, a circuit substrate fitted to the outer member 101 or the like of the wheel support bearing assembly, or in an electric control unit (ECU) mounted on the automotive vehicle.

The operation of the sensor equipped wheel support bearing assembly of the structure described hereinabove will now be described. When a load is applied to the hub axle 110, the outer member 101 is deformed through the rolling elements 105 and this deformation is transmitted to the mounting member 117, fitted to the outer periphery of the outer member 101, resulting in a corresponding deformation of the sensor mounting member 117. The inverse magnetostrictive effect of the recess 117c in the mounting member 117 is measured by the detected by the detecting coil 118. At this time, the mounting member 117 deforms accompanying deformation of the fixing portion of the mounting member 117 in the radial direction, but since the mounting member 117 is fitted to the position where it can be most deformed in the radial direction, the strain of the mounting member 117 becomes so considerable that even the slightest strain of the outer member 101, which is the stationary member, can be detected by the sensor unit 116. In addition, since the mounting member 117 is of an arcuate shape and is provided with the recess 117c and the rigidity at the position where the recess 117c is formed is lowered, more considerable strain than the strain of the outer member 101 occurs in the mounting member 117 and, accordingly, the strain of the outer member 101 can be detected as a considerable inverse magnetostrictive effect.

Also, since of the two contact fixing portions 117a and 117b in the sensor mounting member 117, the first contact fixing portion 117a is positioned at the zenith position lying on the entire circumference, where the outer member 101 is most deformed in the radial direction in response to the load acting on the outer member 101, and the second contact fixing portion 117b is held at a position spaced a few tens degrees from the zenith position in the circumferential direction, where the outer member 101 can be deformed in the radial direction thereof a quantity smaller than that at the zenith position, a further considerable strain occurs in a portion of the mounting member 117, where the detecting coil 118 is mounted when the first contact fixing portion 117a undergoes a considerable deformation with the second contact fixing portion 117b providing the fulcrum, and, accordingly, the strain of the outer member 101 can be detected by the detecting coil 118 as the considerable inverse magnetostrictive effect.

It is to be noted that, of the contact fixing portions 117a and 117b, the second contact fixing portion 117b may be positioned at a location where the direction of the radially induced strain brought about by the external force acting on the outer member 101 or the working force acting between the wheel tire and the road surface is reverse to that occurring in the first contact fixing portion 117. By way of example, the direction of the radially induced deformation of the outer member 101 relative to the axially acting load, acting on a point of contact between the wheel tire and the road surface, at a position above the right transverse position (position 90° above the position adjacent the road surface) of the outer member 101 is reverse to that at a position below the right transverse position (position adjacent the road surface). Assuming that the second contact fixing portion 117b is held at the position below the right transverse position of the outer member 101 where the first contact fixing portion 117a is held at the position (position remote from the road surface) right above the outer member 101, respective directions of deformation of the outer member 101 in the first and second contact fixing portions 117a and 117b are reverse to each other. As discussed above, if the second contact fixing portion 117b and the first contact fixing portion 117a are where the radially induced strain of the outer member 101 occurs in the respective directions reverse to each other, the strains in those directions can be summed up and the more considerable deformation of the outer member 101 can be transmitted to the mounting member 117 and the more considerable deformation can be detected, enabling the strain of the outer member 101 to be detected with higher sensitivity.

The axial position of the outer member 101, where the sensor unit 116 is fitted, may be a position on the outboard side of the outboard raceway surface 103 in the outer member 101 such as in the third embodiment, a position intermediate between the raceway surfaces 103 and 103, or on the inboard side of the inboard raceway surface 103, but the position on the outboard side of the outboard raceway surface 103 is effective to enable detection of the load in the directions reverse to each other since the strain can have a directionality depending on the direction of the load.

According to the FEM analysis and results of experiments, with respect to both of the radially induced strain and the circumferentially induced strain of the outer member 101, the strain could have a directionality in a positive sign or a negative sign in dependence on the positive sign or negative sign of the load such as, for example, the external force or the force, both referred to previously, occurs in a portion on the outboard side out of the 103 locations in the outer member 101. Accordingly, in order to detect the positive or negative direction of the load, it is necessary for the sensor unit 116 to be mounted on the outboard position in the outer member 101.

Where the sensor unit 116 is fitted to the outboard position, since the strain on one side of the zenith position in the circumferential direction and that on the other side of the zenith position in the circumferential direction are opposite or reverse to each other and, therefore, the strain can be detected with high sensitivity even when the first contact fixing portion 117a and the second contact fixing portion 117b are arranged on respective sides of the zenith position.

From the value of the inverse magnetostrictive effect so measured as hereinabove described, the external force or the like acting on the wheel support bearing assembly can be detected. Since the inverse magnetostrictive effect changes differently depending on the direction and the magnitude of the load, if the relation between the inverse magnetostrictive effect and the load is determined beforehand by means of a series of experiments or simulations, the external force acting on the wheel support bearing assembly or the working force acting between the wheel tire and the road surface can be calculated. The external force calculating module 121 and the road surface derived force calculating module 122 are operable in response to the output from the detecting coil 118 to calculate the external force acting on the wheel support bearing assembly and the working force acting between the wheel tire and the road surface, respectively, in reference to the relation between the inverse magnetostrictive effect and the load so determined beforehand by means of the experiments or simulations.

The abnormality determining module 124 is operable to output an abnormality signal to the outside in the event that the working force acting between the wheel tire and the road surface or the external force acting on the wheel support bearing assembly so calculated is determined as exceeding a predetermined allowance. This abnormality signal can be utilized in vehicle control of the automotive vehicle.

Also, if the external force acting on the wheel support bearing assembly or the working force acting between the wheel tire and the road surface is outputted in real time by the external force calculating module 121 and the road surface derived force calculating module 122, a sophisticated vehicle control can be accomplished.

Also, while the wheel support bearing assembly is applied a preload through the inner ring 111, the mounting member 117 will deform even under the influence of such preload. For this reason, if the relation between the inverse magnetostrictive effect and the preload is determined beforehand by means of a series of experiments or simulations, it is possible to ascertain the condition of preload in the wheel support bearing assembly. The bearing preload amount calculating module 123 is operable in response to an output from the detecting coil 118 to output a bearing preload amount in reference to the relation between the inverse magnetostrictive effect and the preload so determined beforehand by means of the experiments or simulations. Also, if the preload amount outputted from the bearing preload amount calculating module 123 is utilized, adjustment of the preload during assemblage of the wheel support bearing assembly can be facilitated.

In the third embodiment described above, although the sensor unit 116 has been shown and described as mounted on a portion of the outer peripheral portion of the outer member 101 remote from the road surface, the sensor unit 116 may be mounted on a portion of the outer peripheral surface of the outer member 101 adjacent the road surface.

Figure 13:
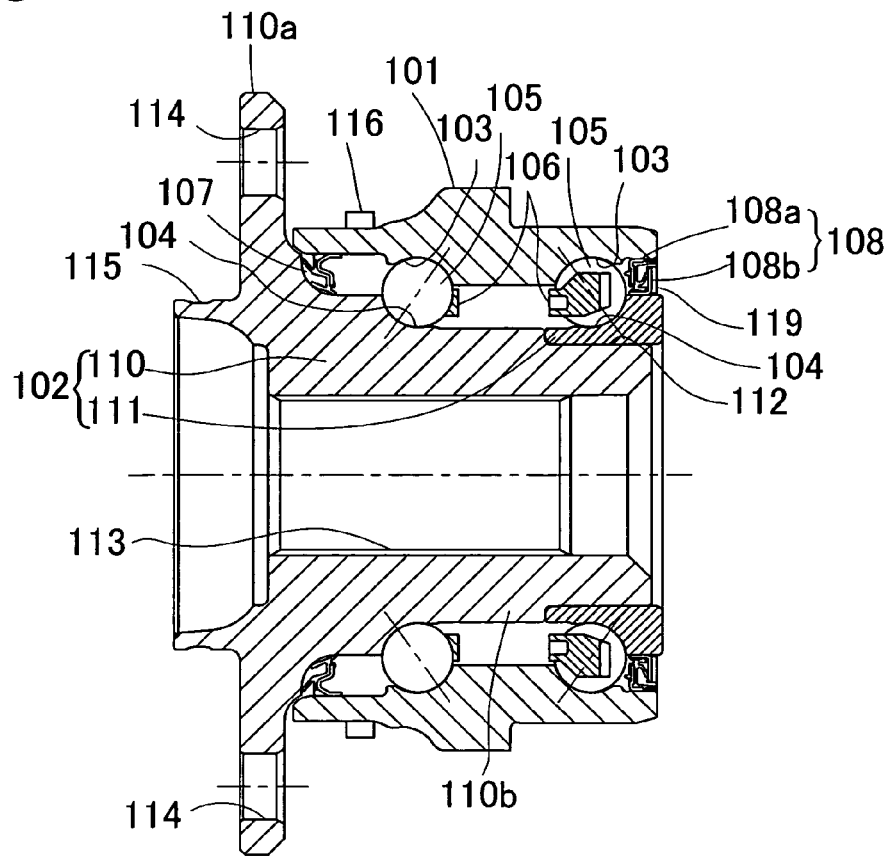
FIG. 13 is a longitudinal sectional view of the sensor equipped wheel support bearing assembly according to a fourth preferred embodiment of the present invention.
Figure 14:
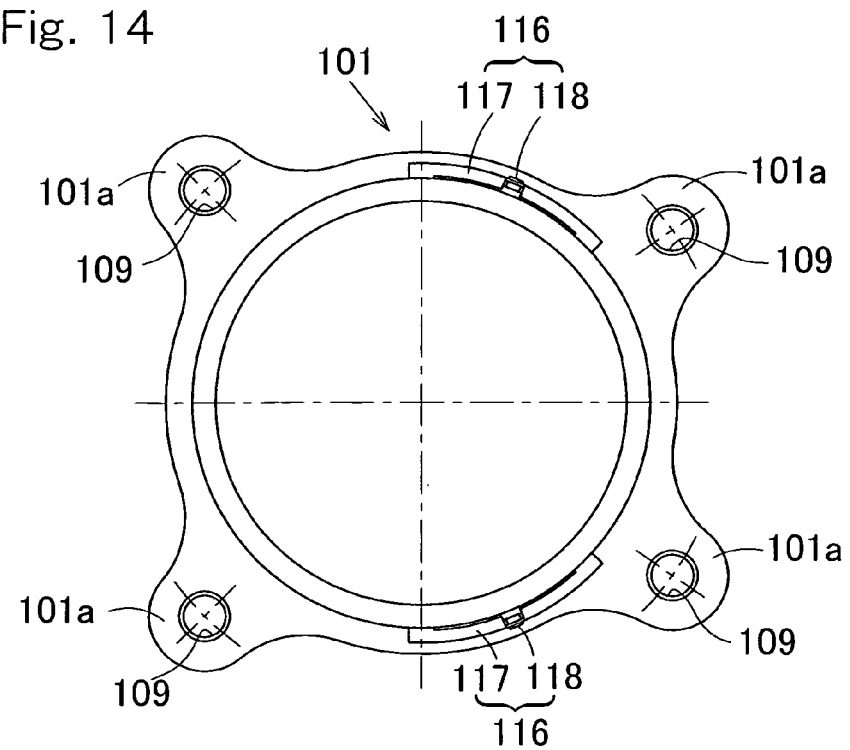
FIG. 14 is a front elevational view of the outer member employed in the wheel support bearing assembly, as viewed from the outboard side.

Also, as shown in a fourth preferred embodiment shown in FIGS. 13 and 14, the sensor unit 116 may be mounted not only on a portion of the outer peripheral surface of the outer member 101 remote from the road surface, but on a portion of the outer peripheral surface of the outer member 101 adjacent the road surface. Where the two or more sensor units 116 are so arranged as hereinabove described, it is possible to detect the load with high accuracy.

Figure 15:
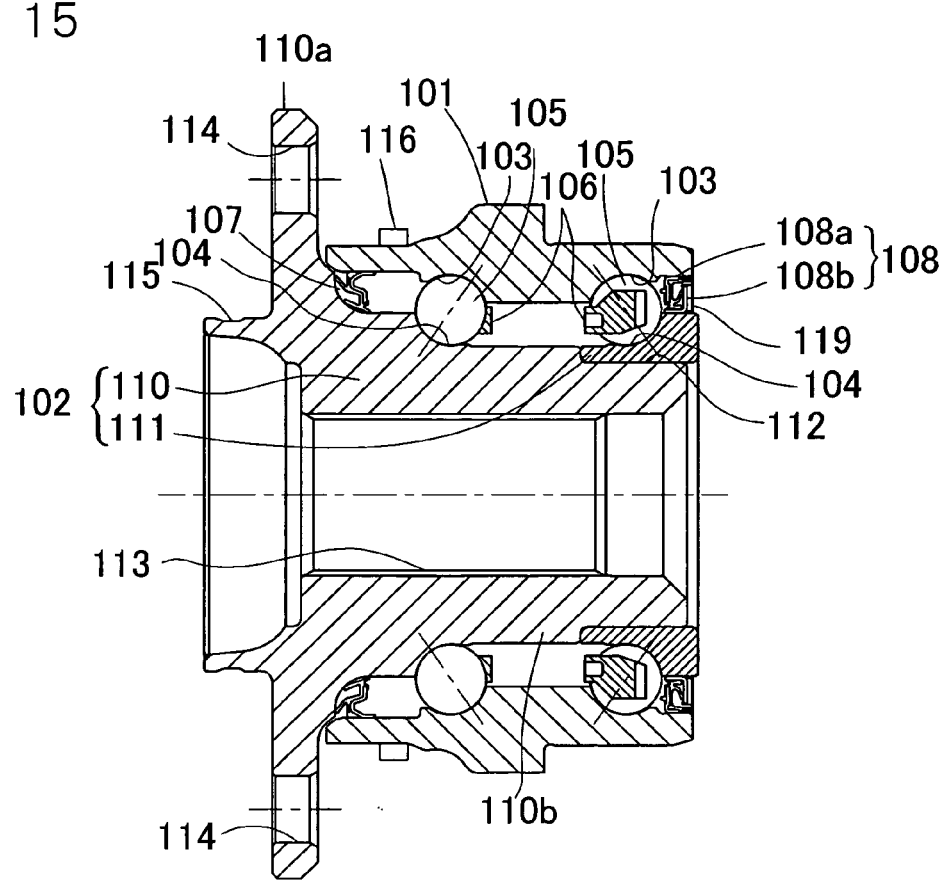
FIG. 15 is a longitudinal sectional view of the sensor equipped wheel support bearing assembly according to a fifth preferred embodiment of the present invention.
Figure 16:
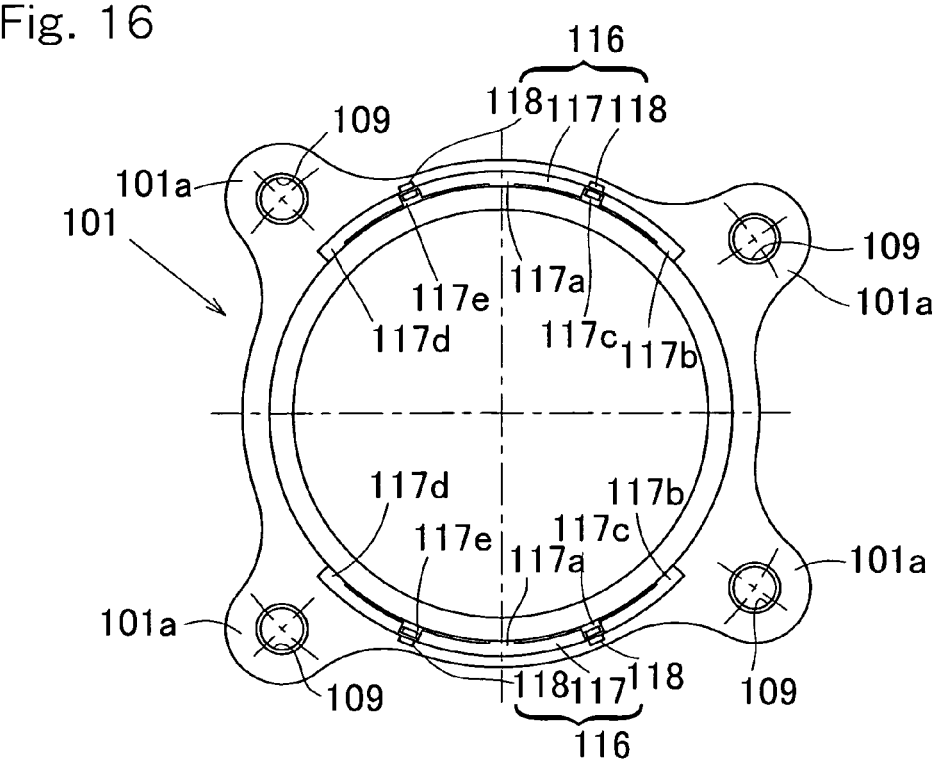
FIG. 16 is a front elevational view of the outer member employed in the wheel support bearing assembly, as viewed from the outboard side.

Yet, each of the sensor units 116 shown in FIGS. 13 and 14 may be of a structure including, as shown in a fifth preferred embodiment of the present invention in FIGS. 15 and 16, three contact fixing portions 117a, 117b and 117d and recesses 117c, 117e positioned between the contact fixing portions 117a and 117b and between the contract fixing portions 117a and 117d, respectively, with the recesses 117c opening radially outwardly of the arcuate shape. Where it is difficult to use a plurality of sensor units 116 by reason of, for example, unavailability of the space, if the mounting member 117 is so structured and so configured as described above, the plurality of the sensor units 116 can easily be installed and a further accurate detection of the load will become possible.

Figure 17:
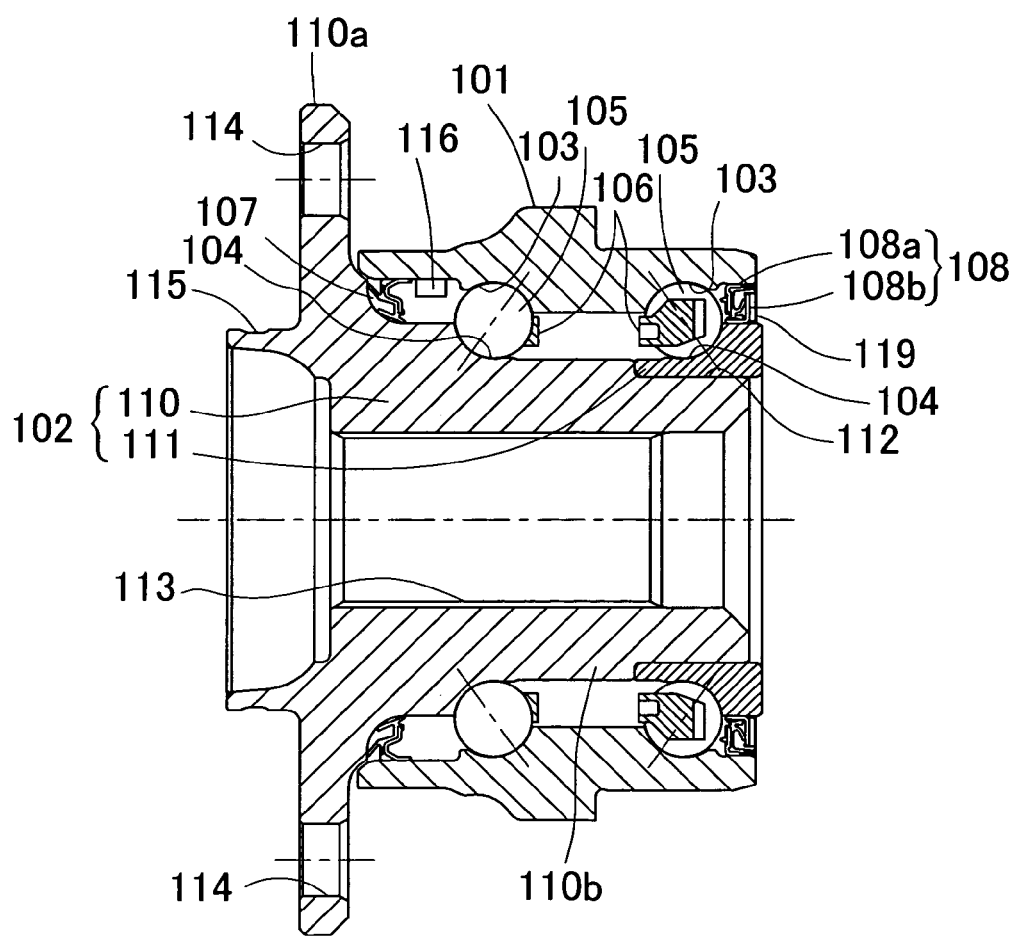
FIG. 17 is a longitudinal sectional view of the sensor equipped wheel support bearing assembly according to a sixth preferred embodiment of the present invention.
Figure 18:
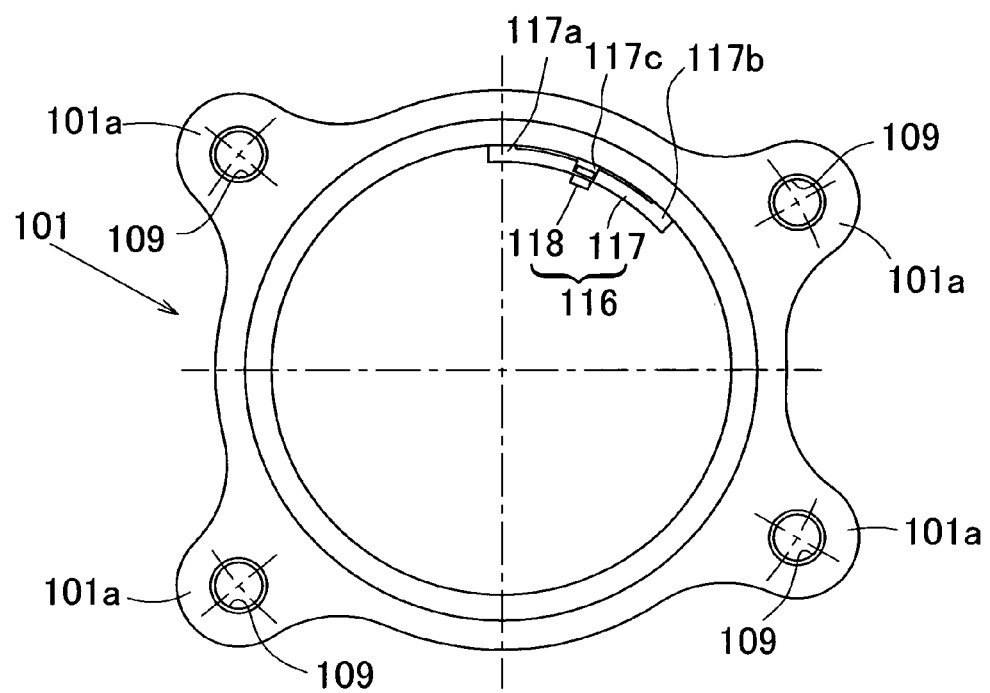
FIG. 18 is a front elevational view of the outer member employed in the wheel support bearing assembly, as viewed from the outboard side.

In addition, in a sixth preferred embodiment of the present invention shown in FIGS. 17 and 18, the sensor unit 16 may be arranged on the inner peripheral surface of the outer member 101. In this case, the contact fixing portions 117a and 117b of the mounting member 117 are of an arcuate shape protruding radially outwardly and, also extending in a circumferential direction, with the recess 117 opening towards the outer periphery of the arcuate shape.

In each of the third to sixth preferred embodiments of the present invention, the mounting member 117 should have such a shape that no plastic deformation occur therein even when the maximum expected load is applied to the wheel support bearing assembly.

Figure 19:
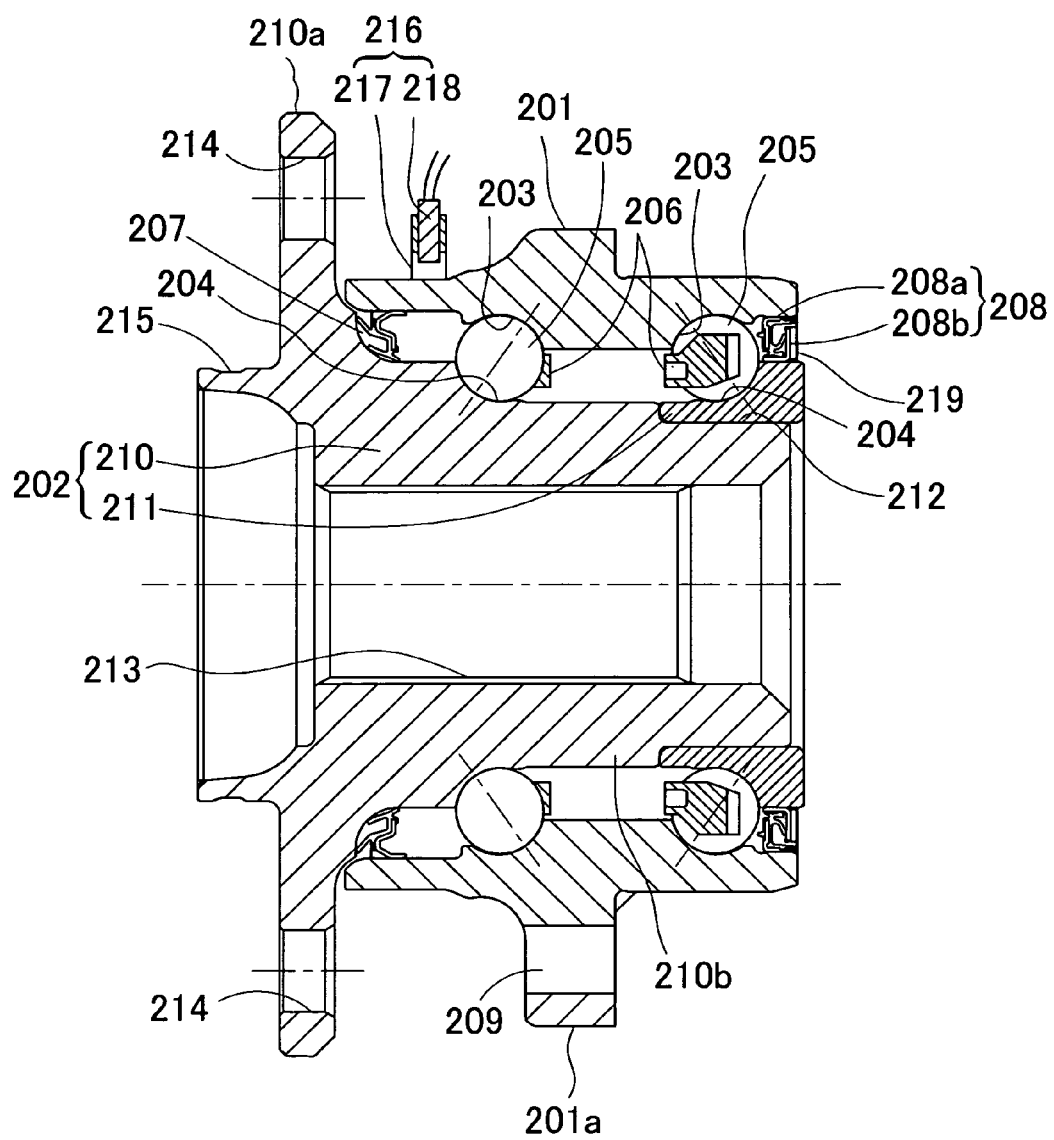
FIG. 19 is a longitudinal sectional view of the sensor equipped wheel support bearing assembly according to a seventh preferred embodiment of the present invention.
Figure 20:
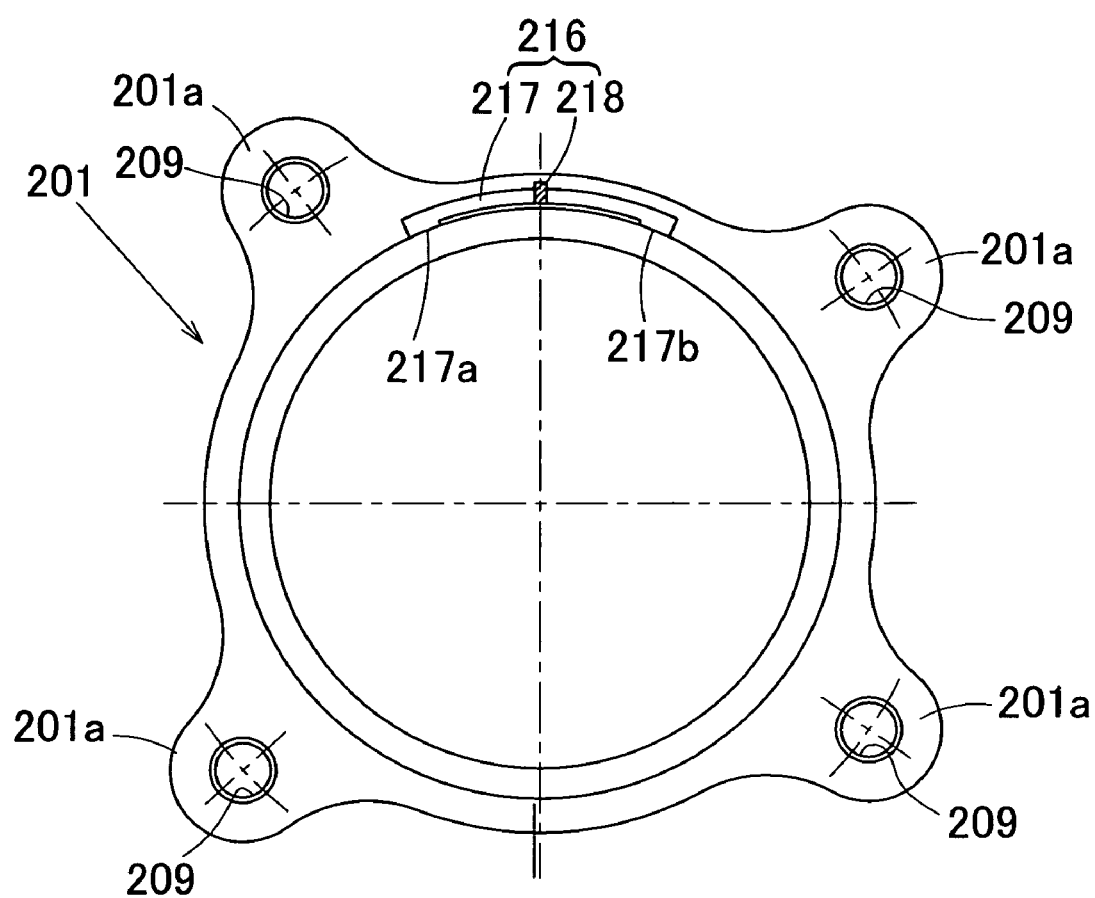
FIG. 20 is a front elevational view of the outer member employed in the wheel support bearing assembly, as viewed from the outboard side.
Figure 21A:
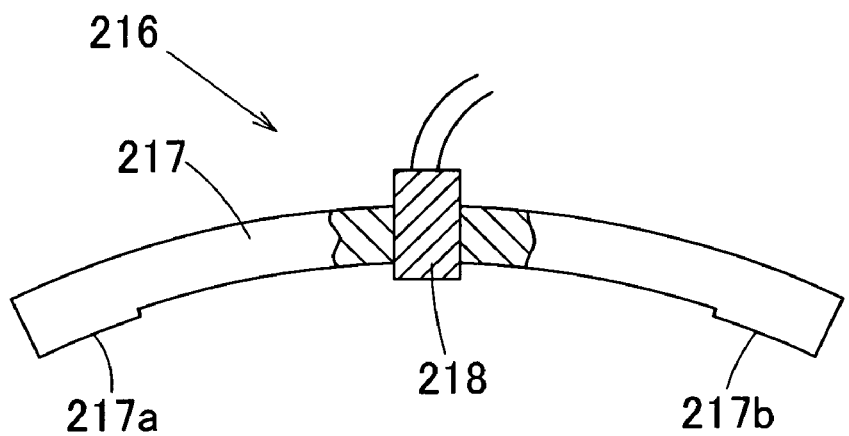
FIG. 21A is a side view of the sensor unit employed in the wheel support bearing assembly.
Figure 21B:
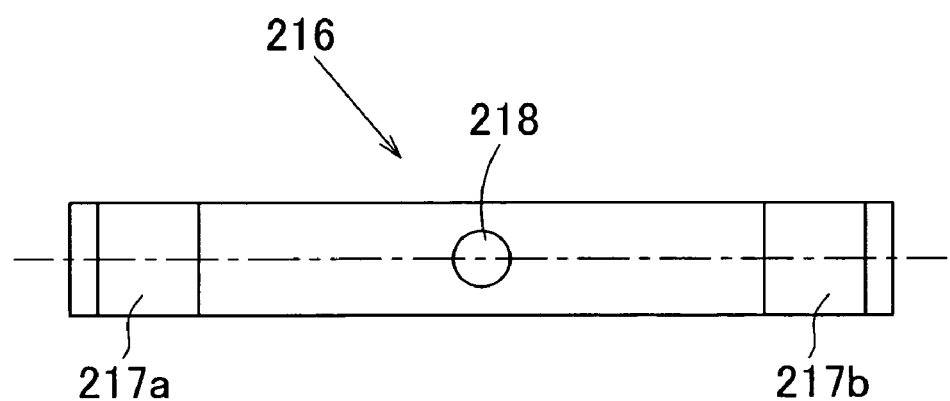
FIG. 21B is a rear view of the sensor unit.

Hereinafter, a seventh preferred embodiment of the present invention will be described with particular reference to FIGS. 19 to 21. Even this embodiment is applied to the wheel support bearing assembly for the support of a vehicle drive wheel, which is an inner rotating model of a third generation type. It is to be noted that even in this embodiment, one side of an automotive vehicle body away from the longitudinal center of the automotive vehicle body is referred to as "outboard", and the opposite side of the automotive vehicle body close towards the longitudinal center of the automotive vehicle body is referred to as "inboard".

This wheel support bearing assembly includes an outer member 201 having an inner periphery formed with a plurality of rows of raceway surfaces 203, an inner member 202 formed with raceway surfaces 204 held in face-to-face relation with the raceway surfaces 203, and a plurality of rows of rolling elements 205 interposed between the respective raceway surfaces 203 and 204 in the outer member 201 and the inner member 202. The wheel support bearing device is rendered to be of a double row, angular contact ball bearing type, and the rolling elements 205 are employed in the form of a ball and supported by respective retainers 206 one employed for each of the rows of the rolling elements 205. The raceway surfaces 203 and 204 referred to above have an arcuate shape in cross-section and are so formed as to represent respective rolling element contact angles that are held in back-to-back relation with each other. Opposite open ends of an annular bearing space delimited between the outer member 201 and the inner member 202 are sealed respectively by outboard and inboard sealing units 207 and 208.

The outer member 201 serves as a stationary member and is of one-piece construction having an outer periphery formed with a vehicle body fitting flange 201a that is secured to a knuckle forming a part of the automobile suspension system (not shown) mounted on an automotive body structure. The flange 201a is provided with vehicle body fitting holes 209 at respective locations spaced in a direction circumferentially thereof.

The inner member 202 serves as a rotatable member and is made up of a hub axle 210 having an outer periphery formed with a wheel mounting hub flange 210a, and an inner ring 211 mounted on an inboard end of an axle portion 210b of the hub axle 210. The raceway surfaces 204 one for each row are formed in the hub axle 210 and the inner ring 211, respectively. The inboard end of the hub axle 210 has its outer periphery provided with an inner ring mounting surface 212 which is radially inwardly stepped to have a small diameter, and the inner ring 211 is mounted on this inner ring mounting surface 212. The hub axle 210 has a center bore 213 defined therein so as to extend therethrough in a direction axially thereof. The hub flange 210a is provided with a plurality of press-fitting holes 214 defined at respective locations circumferentially thereof for receiving corresponding hub bolts (not shown). At a portion of the hub axle 210 adjacent the root of the hub flange 210a, a cylindrical pilot portion 215 for guiding a vehicle wheel and a brake component parts (both not shown) protrudes towards the outboard side.

A sensor unit 216 is mounted on an inner periphery of an outboard end of the outer member 201. The axial position of the sensor unit 216 is rendered to be on an outboard side of the outboard raceway surface 204 in the outer member 101 and on an inboard side of the inboard sealing unit 207. The outer member 201 as viewed from the outboard side is shown in FIG. 20 in a front elevational view. As shown therein, the sensor unit 216 includes a sensor mounting member 217 fixed on an outer peripheral surface of the outer member 201, and a displacement sensor 218 mounted on this sensor mounting member 217 for measuring a relative displacement between the sensor mounting member 217 and the stationary member. The displacement sensor 218 may be employed in the form of an eddy current sensor, a magnetic sensor, an optical sensor, an ultrasonic sensor or a contact type sensor.

The sensor mounting member 217 is of a shape and made of a material, which does not undergo plastic deformation when fixed. In this seventh embodiment, the sensor mounting member 217 is, a shown in side and rear views in FIGS. 21A and 11B, respectively, of an elongated, substantially arcuate shape curved to follow the circumference of the outer member 201 and has its opposite ends formed with respective contact fixing portions 217a and 217b of an arcuate shape protruding radially inwardly and, also extending in a circumferential direction. The displacement sensor 218 is mounted on an intermediate portion of the sensor mounting member 217 so as to extend radially thereacross. For example, the sensor mounting member 217 has a rectangular shape in its cross section, but it may have any suitable shape.

The sensor unit 216 referred to above is fixedly secured to an outer peripheral surface of the outer member 201 through the contact fixing portions 217a and 217b of the sensor mounting member 217, with the lengthwise direction of the sensor mounting member 217 oriented in a direction circumferentially of the outer member 201. Fixing of the contact fixing portions 217a and 217b to the outer member 201 is carried out by the use of bolts or a bonding agent. It is to be noted that a gap is formed between the sensor mounting member 217 and the outer member 201 except for respective portions of the sensor mounting member 217 that are occupied by the contact fixing portions 217a and 217b.

In the case of this seventh embodiment, the contact fixing portions 217a and 217b are positioned at respective locations spaced a few tens degree leftwards and rightwards from the zenith position (position remote from the road surface) on the entire circumference of the outer member 201 and the sensor unit 216 is so arranged that the position of the sensor mounting member 217, where the displacement sensor 218 is mounted, can occupy the zenith position referred to above. The zenith position lying on the entire circumference of the outer member 201 is where when an axially acting load is imposed on the outer member 201, the outer member 201 can be most deformed in a radial direction thereof whereas the position circumferentially spaced a few tens degrees from the zenith position is where the outer member 201 can be deformed in the radial direction thereof a quantity smaller than that at the zenith position.

The sensor mounting member 217 is preferably of a kind which does not plastically deform when an external force acting on the wheel support bearing assembly or a working force acting between the wheel tire and the road surface attains the highest expected value. Once the plastic deformation occurs, deformation of the outer member 201 will not be accurately transmitted to the sensor mounting member 217 and measurement of the displacement of the outer member 201 by the displacement sensor 218 will be affected adversely. If the sensor mounting member 217 is made of the same material as that for the outer member 201, it is possible to minimize temperature dependent influences on the detecting accuracy.

It is to be noted that the inboard sealing unit 208 includes a sealing member 208a made of an elastic material such as, for example, rubber equipped with a core metal fitted to the inner peripheral surface of the outer member 201, and a slinger 208b fitted to the outer peripheral surface of the inner ring 210 and engageable with the sealing member 208a, and a magnetic encoder 219 for the detection of the rotation, which is in the form of a multipolar magnet having magnetic poles alternating in a direction circumferentially thereof, is provided in the slinger 208b. Cooperable with the magnetic encoder 219 is a magnetic sensor (not shown) mounted on the outer member 201 in face-to-face relation therewith.

Figure 22:
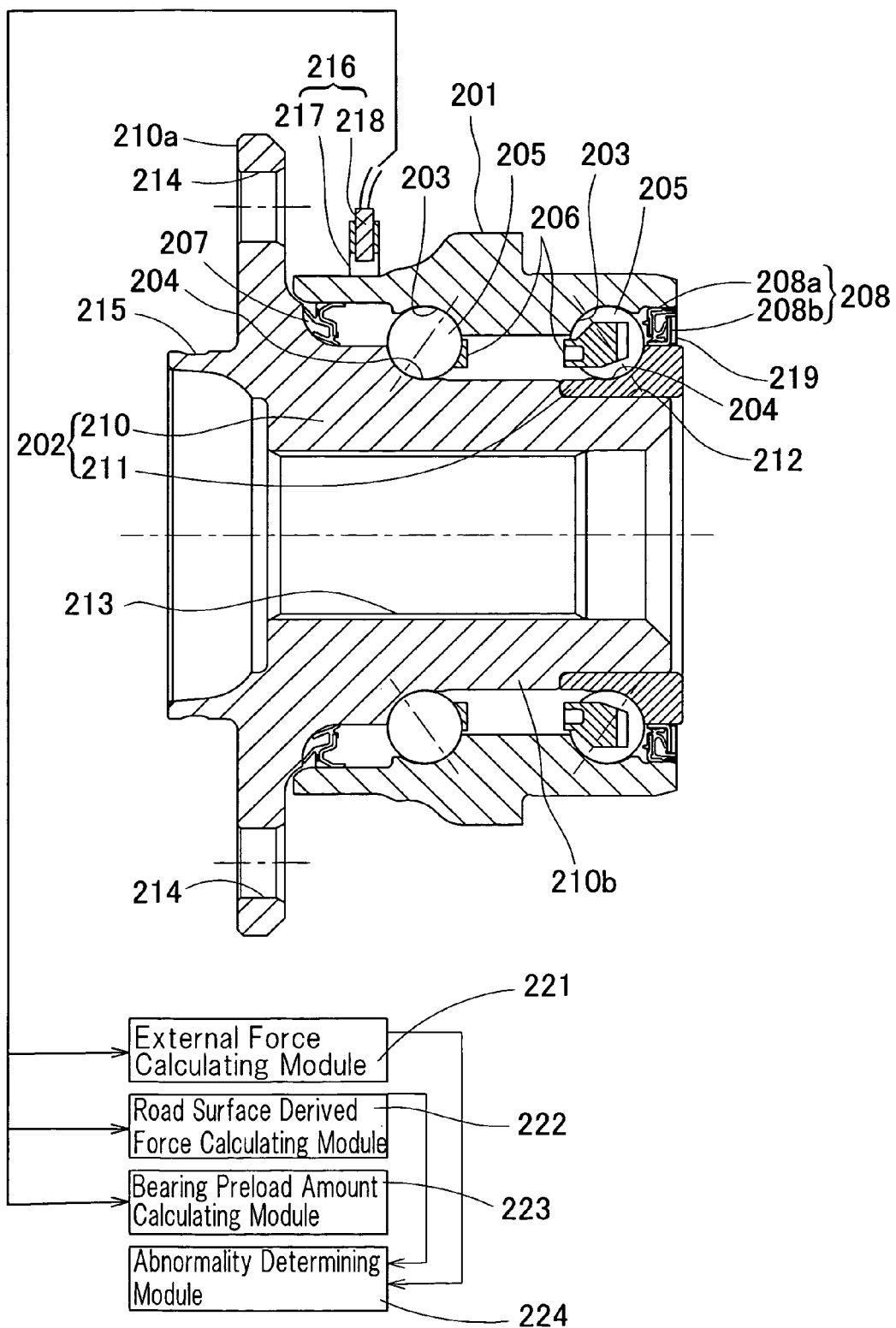
FIG. 22 is an explanatory diagram showing a sectional view of the wheel support bearing assembly together with a circuit block diagram showing a conceptual construction of a detecting system therefor.

As shown in FIG. 22, as a means for processing an output from the sensor unit 216, a circuit unit is provided, which includes an external force calculating module 221, a road surface derived force calculating module 222, a bearing preload amount calculating module 223 and an abnormality determining module 224. This circuit unit including those modules 221 to 224 may be incorporated in an electronic circuit device (not shown) such as, for example, a circuit substrate fitted to the outer member 201 or the like of the wheel support bearing assembly, or in an electric control unit (ECU) mounted on the automotive vehicle.

The operation of the sensor equipped wheel support bearing assembly of the structure described hereinabove will now be described. When a load is applied to the hub axle 210, the outer member 201 is deformed through the rolling elements 205 and this deformation is transmitted to the mounting member 217, fitted to the inner periphery of the outer member 201, resulting in a corresponding deformation of the sensor mounting member 217. Accordingly, the radial distance between the outer member 201 and the sensor mounting member 217 changes and the displacement sensor 218 measures such change in distance. At this time, since portions of the outer member 201, where the contact fixing portions 217a and 217b of the sensor mounting member 217 are secured (respective positions spaced a few tens degrees leftwards and rightwards from the zenith position in the circumferential direction) do not deform in the radial direction, but a portion of the outer member 201 at the zenith position confronting the position where the displacement sensor 218 is arranged deforms considerably in the radial direction, the radial distance between the outer peripheral surface of the outer member 201 and the position of the sensor mounting member 217, where the displacement sensor 218 is mounted, changes considerably in response to such deformation in the radial direction and, accordingly, even the slightest strain occurring in the outer member 201, which is the stationary member, can be detected with the sensor unit 216.

The axial position of the outer member 201, where the sensor unit 216 is fitted, may be a position on the outboard side of the outboard raceway surface 203 in the outer member 201 such as in the seventh embodiment, a position intermediate between the raceway surfaces 203 and 203, or on the inboard side of the inboard raceway surface 203, but the position on the outboard side of the outboard raceway surface 203 is effective to enable detection of the load in the directions reverse to each other since the strain can have a directionality depending on the direction of the load.

According to the FEM analysis and results of experiments, with respect to both of the radially induced strain and the circumferentially induced strain of the outer member 201, the strain could have a directionality in a positive sign or a negative sign in dependence on the positive sign or negative sign of the load such as, for example, the external force or the force, both referred to previously, occurs in a portion on the outboard side out of the three locations in the outer member 201.

Accordingly, in order to detect the positive or negative direction of the load, it is necessary for the sensor unit 216 to be mounted on the outboard position in the outer member 201.

From the value of the displacement of the outer member 201 (the radial distance between the outer member 201 and the sensor mounting member 217) so measured as hereinabove described, the external force or the like acting on the wheel support bearing assembly can be detected. Since the amount of displacement varies differently depending on the direction and the magnitude of the load, if the relation between the amount of displacement and the load is determined beforehand by means of a series of experiments or simulations, the external force acting on the wheel support bearing assembly or the working force acting between the wheel tire and the road surface can be calculated. The external force calculating module 221 and the road surface derived force calculating module 222 are operable in response to the output from the displacement sensor 218 to calculate the external force acting on the wheel support bearing assembly and the working force acting between the wheel tire and the road surface, respectively, in reference to the relation between the amount of displacement and the load so determined beforehand by means of the experiments or simulations.

The abnormality determining module 224 is operable to output an abnormality signal to the outside in the event that the working force acting between the wheel tire and the road surface or the external force acting on the wheel support bearing assembly so calculated is determined as exceeding a predetermined allowance. This abnormality signal can be utilized in vehicle control of the automotive vehicle.

Also, if the external force acting on the wheel support bearing assembly or the working force acting between the wheel tire and the road surface is outputted in real time by the external force calculating module 221 and the road surface derived force calculating module 222, a sophisticated vehicle control can be accomplished.

Also, while the wheel support bearing assembly is applied a preload through the inner ring 211, the sensor mounting member 217 will deform even under the influence of such preload. For this reason, if the relation between the amount of displacement and the preload is determined beforehand by means of a series of experiments or simulations, it is possible to ascertain the condition of preload in the wheel support bearing assembly. The bearing preload amount calculating module 223 is operable in response to an output from the displacement sensor 218 to output a bearing preload amount in reference to the relation between the amount of displacement and the preload so determined beforehand by means of the experiments or simulations. Also, if the preload amount outputted from the bearing preload amount calculating module 223 is utilized, adjustment of the preload during assemblage of the wheel support bearing assembly can be facilitated.

In the seventh embodiment described above, although the sensor unit 216 has been shown and described as mounted on a portion of the outer peripheral portion of the outer member 201 remote from the road surface, the sensor unit 216 may be mounted on a portion of the outer peripheral surface of the outer member 201 adjacent the road surface.

Figure 23:
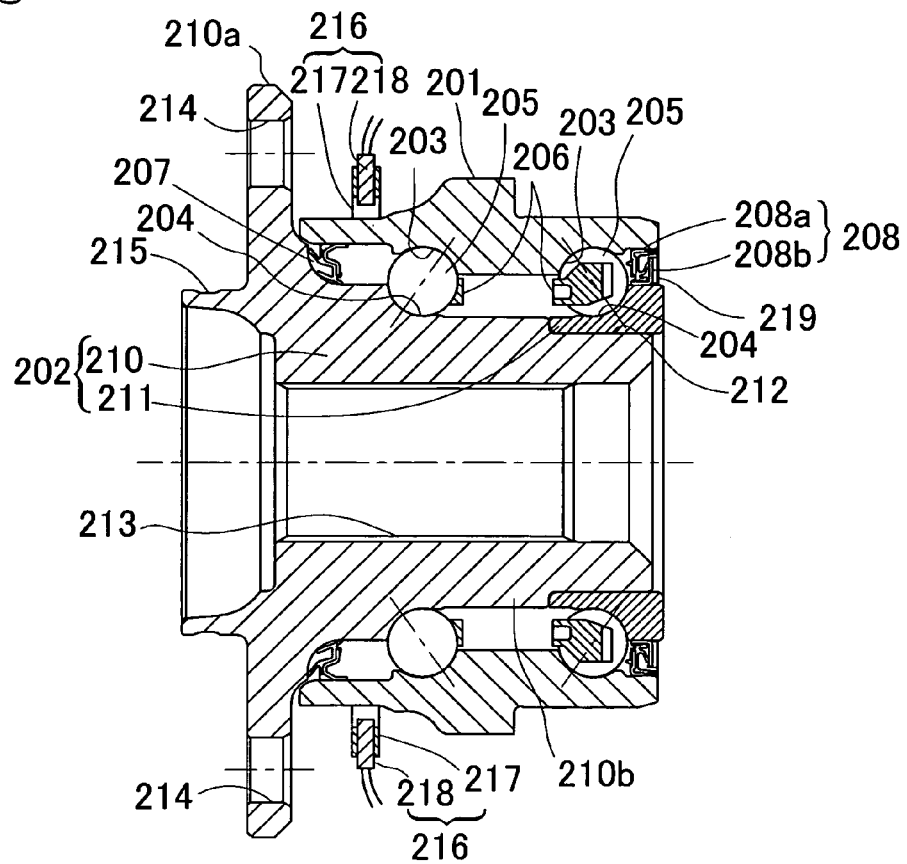
FIG. 23 is a longitudinal sectional view of the sensor equipped wheel support bearing assembly according to an eighth preferred embodiment of the present invention.
Figure 24:
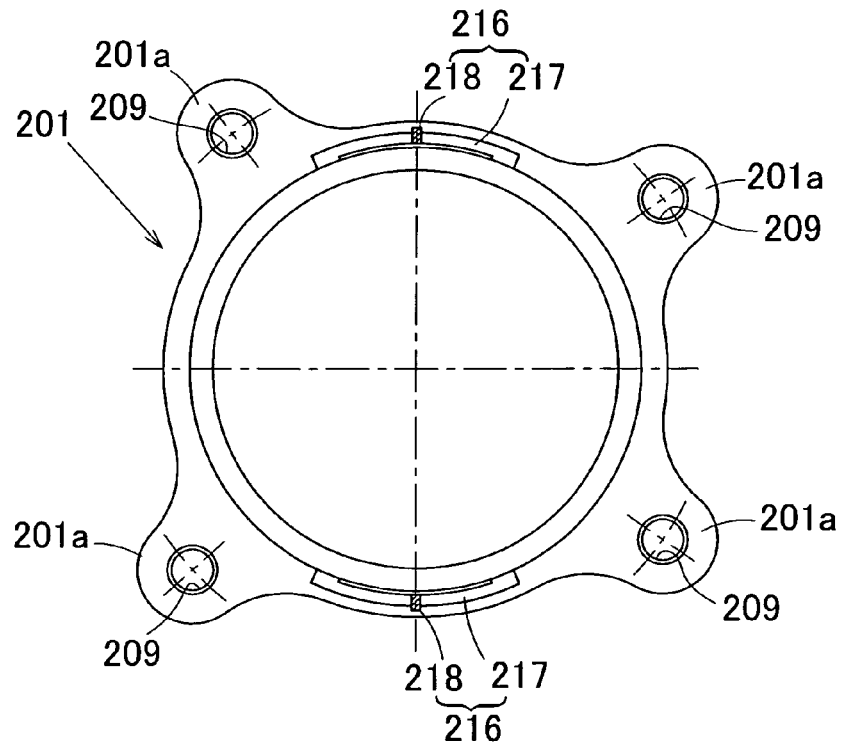
FIG. 24 is a front elevational view of the outer member employed in the wheel support bearing assembly, as viewed from the outboard side.

Also, as shown in an eighth preferred embodiment shown in FIGS. 23 and 24, the sensor unit 216 may be mounted each of respective portions of the outer peripheral surface of the outer member 201 remote from and adjacent to the road surface, where different degrees of change in deformation in the radial direction occur. Where the two or more sensor units 216 are so arranged as hereinabove described, it is possible to detect the load with high accuracy.

Figure 25:
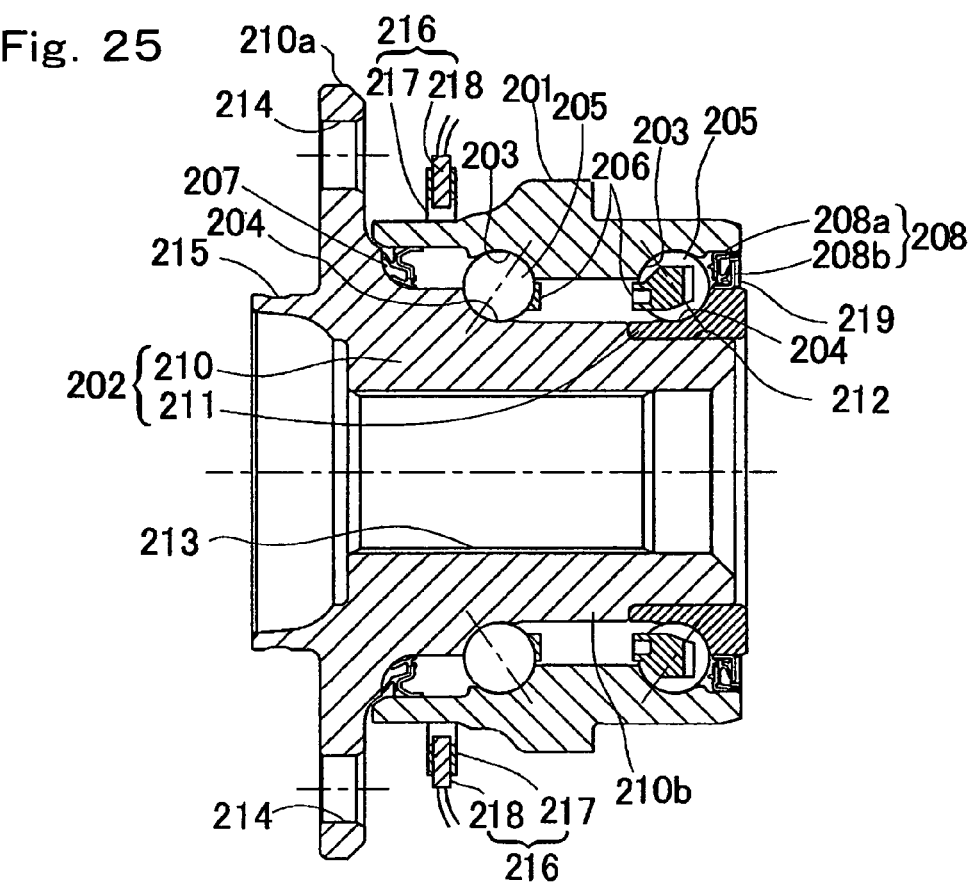
FIG. 25 is a front elevational view of the outer member employed in the wheel support bearing assembly according to a ninth preferred embodiment of the present invention.
Figure 26:
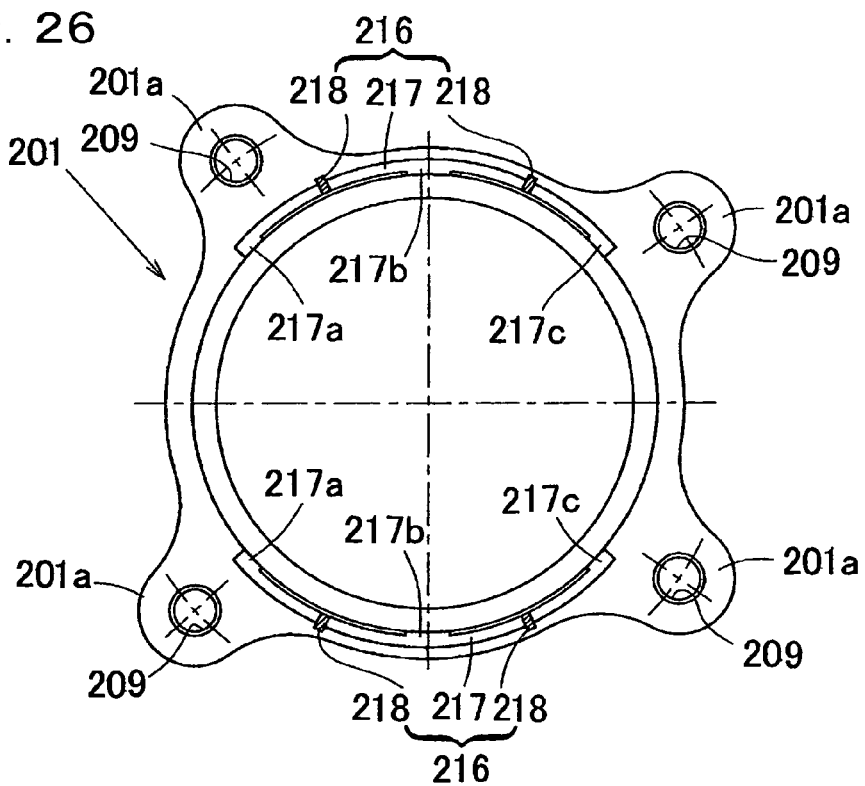
FIG. 26 is a front elevational view of the outer member employed in the wheel support bearing assembly, as viewed from the outboard side.

Yet, each of the sensor units 216 shown in FIGS. 23 and 24 may be of a structure including, as shown in a ninth preferred embodiment of the present invention in FIGS. 25 and 26, three contact fixing portions 217a, 217b and 217d and two displacement sensors 218 positioned between the contact fixing portions 217a and 217b and between the contract fixing portions 217b and 217c, respectively. Where it is difficult to use a plurality of sensor units 216 by reason of, for example, unavailability of the space, if the sensor mounting member 217 is so structured and so configured as described above, the plurality of the sensor units 216 can easily be installed and a further accurate detection of the load will become possible.

Figure 27:
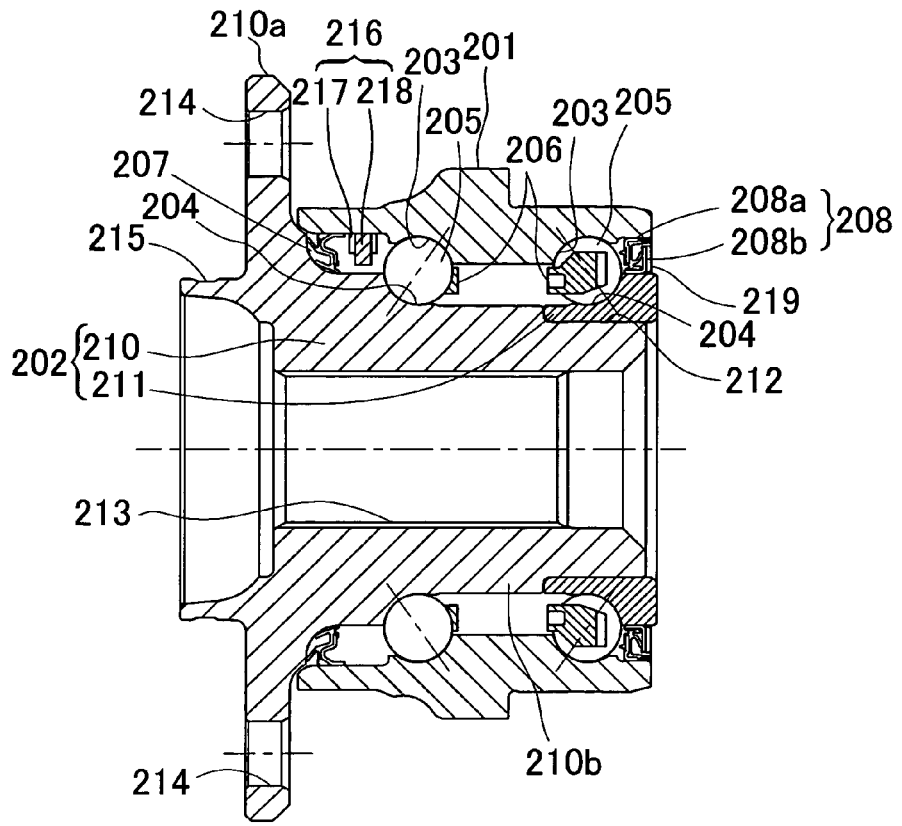
FIG. 27 is a longitudinal sectional view of the sensor equipped wheel support bearing assembly according to a tenth preferred embodiment of the present invention.
Figure 28:
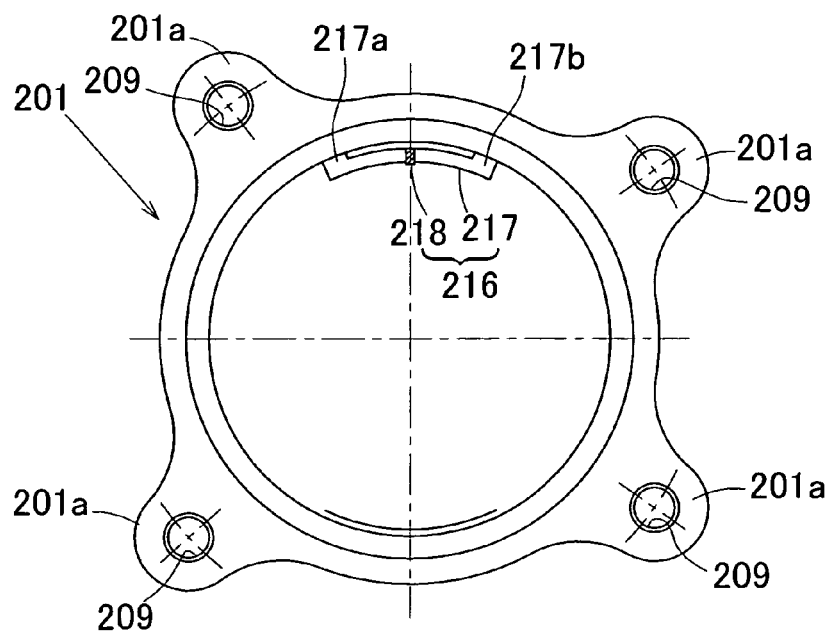
FIG. 28 is a front elevational view of the outer member employed in the wheel support bearing assembly, as viewed from the outboard side.

In addition, in a tenth preferred embodiment of the present invention shown in FIGS. 27 and 28, the sensor unit 216 may be arranged on the inner peripheral surface of the outer member 201. In this case, the contact fixing portions 217a and 217b of the sensor mounting member 217 are of an arcuate shape protruding radially outwardly and, also extending in a circumferential direction.

In each of the seventh to tenth preferred embodiments of the present invention, the sensor mounting member 217 should have such a shape that no plastic deformation occur therein even when the maximum expected load is applied to the wheel support bearing assembly.

Although in describing any one of the foregoing embodiments of the present invention, the outer member has been shown and described as serving the stationary member, the present invention can be applied to the wheel support bearing assembly, in which the inner member serves as the stationary member. In such case, the sensor mounting member 17 or 217 or the mounting member 117 has to be fitted to the peripheral surface which will become an outer periphery or an inner periphery of the inner member.

Also, although any one of the foregoing embodiments of the present invention has been shown and described as applied to the wheel support bearing assembly of the third generation type, the present invention can be equally applied to the wheel support bearing assembly of the first or the second generation type, in which the bearing unit and the hub are constituted by members separate from each other, respectively, and also to the wheel support bearing assembly of the fourth generation type, in which a portion of the inner member is constituted by an outer ring of the constant velocity joint. Yet, this wheel support bearing assembly can be applied to the wheel support bearing assembly for the support of the coupled driving wheel (the non-drive wheel) and, also, to the wheel support bearing assembly of any generation type, in which the rolling elements are employed in the form of a tapered roller.

Hereinafter, some possible aspects will be demonstrated, which utilize any one of the sensor equipped wheel bearing assemblies according to the fourth to seventh aspects, respectively, or any one of the sensor equipped wheel support bearing assemblies according to the first, eighth and ninth aspects, respectively, and which will form a preferred embodiment of the present invention.

[11th Aspect]

The sensor equipped wheel support bearing assembly according to any one of the fourth to seventh aspects, in which the sensor unit is employed in a plural number.

In other words, the sensor unit referred to above may be in a plural number. Since if the sensor unit is in a plural number, strains occurring at a plurality of locations of the stationary member can be detected by the plural detecting coils and the load or the like acting on the vehicle wheel can be detected from respective outputs from the plural detecting coils, the accuracy of detection of the load or the like acting on the vehicle wheel can be increased.

[12th Aspect]

The sensor equipped wheel support bearing assembly according to any one of the fourth to seventh and eleventh aspects referred to above, in which the sensor unit is arranged at a position on the outboard side of the outboard raceway surface in the stationary member.

In other words, the sensor unit referred to above is preferably arranged at a position on the outboard side of the outboard raceway surface in the stationary member.

According to the analysis and the results of experiments, with respect to both of the radially induced strain and the circumferentially induced strain of the stationary member, only an outboard portion of the stationary member is where the strain could have a directionality in a positive sign or a negative sign in dependence on the positive sign or negative sign of the load such as, for example, the external force or the force, both referred to previously. Accordingly, in order to detect the direction in the positive or negative direction of the load, it is necessary for the sensor unit to be mounted on the outboard position of the outer member.

[13th Aspect]

The sensor equipped wheel support bearing assembly according to the twelfth aspect, in which the sensor unit is mounted on a peripheral surface of the stationary member.

In other words, the sensor unit is preferably fitted to the peripheral surface of the stationary member. Although the sensor unit may be fitted to any of the peripheral surface or end face of the stationary member, deformation of the stationary member can easily be transmitted to the mounting member, if the sensor unit is fitted to the peripheral surface, and, therefore, the strain of the stationary member can be detected with high sensitivity.

[14th Aspect]

The sensor equipped wheel support bearing assembly according to the thirteenth aspect, in which the sensor unit is fitted to the inner peripheral surface of the stationary member and the sealing unit for sealing the annular bearing space between the outer member and the inner member is provided on the outboard side of the sensor unit.

In other words, where the sensor unit is fitted to the peripheral surface on the side of the inner periphery of the stationary member, the sealing unit for sealing the annular bearing space between the outer member and the inner member is preferably provided on the outboard side of the sensor unit.

If where the sensor unit is fitted to the peripheral surface on the side of the inner periphery of the stationary member, the sealing unit for sealing the annular bearing space is provided on the outboard side of the sensor unit, the sensor unit will be immune from any influence brought about by muddy water or the like and the need to use the sealing unit dedicated for the sensor unit can be dispensed with.

[15th Aspect]

The sensor equipped wheel support bearing assembly according to any one of the fourth to seventh and eleventh to fourteenth aspects, in which the mounting member does not undergo plastic deformation at the maximum expected value of the external force acting on the wheel support bearing assembly or the working force acting between the wheel tire and the road surface.

In other words, the mounting member is preferably of a type that does preferably not undergo plastic deformation at the maximum expected value of the external force acting on the wheel support bearing assembly or the working force acting between the wheel tire and the road surface.

Once the plastic deformation occurs, the deformation of the stationary member will not be accurately transmitted to the mounting member enough to adversely affect the strain measurement. However, if the mounting member does not undergo plastic deformation at the maximum expected value of the external force acting on the wheel support bearing assembly or the working force acting between the wheel tire and the road surface, the deformation will be accurately transmitted to the mounting member and the strain of the mounting member can be detected with high precision.

[16th Aspect]

The sensor equipped wheel support bearing assembly according to any one of fourth to seventh and eleventh to fifteenth aspects, in which the mounting member is made of a magnetostrictive material such as, for example, Ni or the like having a negative magnetostrictive constant.

In other words, although the mounting member may be made of any material provided that it is a magnetostrictive material, it is preferably a magnetostrictive material such as, for example, Ni or the like having a negative magnetostrictive constant. If it is the magnetostrictive material having the negative magnetostrictive constant, the strain can be detected with high sensitivity.

[17th Aspect]

The sensor equipped wheel support bearing assembly according to the first aspect, in which the sensor unit includes the sensor mounting member and the displacement sensor.

[18th Aspect]

The sensor equipped wheel support bearing assembly according to any one of the seventeenth, eighth and ninth aspects, in which the sensor unit is in a plural number.

In other words, the sensor unit may be employed in a plural number. If the sensor unit is in the plural number, the displacement at a plurality of locations of the stationary member can be detected by the plural displacement sensors and from respective outputs of the plural displacement sensors, the load or the like acting on the vehicle wheel can be detected and, therefore, the sensitivity of detection of the load or the like on the vehicle wheel can be increased.

[19th Aspect]

The sensor equipped wheel support bearing assembly according to any one of seventeenth, eighth, ninth and eighteenth aspect, in which the sensor unit is arranged on a portion on the outboard side of the stationary member.

In other words, the sensor unit is preferably arranged on the outboard portion of the stationary member.

According to the analysis and the results of experiments, with respect to both of the radially induced strain and the circumferentially induced strain of the stationary member, only a portion on the outboard side of the stationary member is where the strain could have a directionality in a positive sign or a negative sign in dependence on the positive sign or negative sign of the load such as, for example, the external force or the force, both referred to previously. Accordingly, in order to detect the direction in the positive or negative direction of the load, it is necessary for the sensor unit to be mounted on the outboard portion of the outer member.

[20th Aspect]

The sensor equipped wheel support bearing assembly according to the nineteenth aspect, in which the sensor unit is provided on the peripheral surface of the stationary member.

In other words, the sensor unit is preferably provided on the peripheral surface of the stationary member. The sensor unit may be provided on either the peripheral surface or the end face of the stationary member, but if it is provided on the peripheral surface, the deformation of the stationary member can easily be transmitted to the sensor mounting member and the displacement of the stationary member can be detected with high sensitivity.

[21st Aspect]

The sensor equipped wheel support bearing assembly according to any one of the seventeenth, eighteenth, ninth and eighteenth to twentieth aspects, in which the sensor mounting member of the sensor unit will not undergo plastic deformation at the maximum expected value of the external force acting on stationary member or the working force acting between the wheel tire and the road surface.

In other words, at the maximum expected value of the external force acting on stationary member or the working force acting between the wheel tire and the road surface, the sensor mounting member of the sensor unit is preferably of a type that does not undergo the plastic deformation.

Once the plastic deformation occurs, the deformation of the stationary member will not be accurately transmitted to the sensor mounting member enough to adversely affect the displacement measurement, but if the sensor mounting member does not undergo plastic deformation at the maximum expected value of the external force or the working force, the deformation of the stationary member will be accurately transmitted to the mounting member and the displacement of the mounting member can be detected with high precision.

[22nd Aspect]

The sensor equipped wheel support bearing assembly according to nay one of the seventeenth, eighth, ninth and eighteenth to twenty-first aspects, in which the displacement sensor is in the form of an eddy current sensor, a magnetic sensor, an optical sensor, a contact type sensor or an ultrasonic sensor.

In other words, for the displacement sensor, any of the eddy current sensor, the magnetic sensor, the optical sensor, the contact type sensor and the ultrasonic sensor can be employed.

What is claimed is:

1. A sensor equipped wheel support bearing assembly to rotatably support a vehicle wheel relative to a vehicle body structure, comprising:

an outer member having an inner periphery formed with a plurality of rows of raceway surfaces, an inner member having raceway surfaces formed therein in face-to-face relation with the raceway surfaces in the outer member, and a plurality of rows of rolling elements interposed between those raceway surfaces, respectively; and a sensor unit comprising a separate sensor mounting member and a strain sensor or a displacement sensor fitted to the sensor mounting member, or a mounting member made of a magnetostrictive material and a detecting coil fitted to the mounting member, the sensor unit being fitted to a stationary member, which is one of the outer member and the inner member; and wherein the sensor mounting member or the mounting member made of the magnetostrictive material includes at least two contact fixing portion relative to the stationary member and the strain sensor, the displacement sensor or the detecting coil is arranged at least one location between the contact fixing portions.

2. The sensor equipped wheel support bearing assembly as claimed in claim 1, wherein the stationary member, which is one of the outer member and the inner member, includes vehicle body fitting holes, the neighboring two vehicle body fitting holes adjacent a road surface or remote from the road surface are spaced a distance corresponding to a phase difference of 80° or more, and the sensor unit comprising the sensor mounting member and the strain sensor or displacement sensor is fitted between the neighboring two vehicle body fitting holes, and wherein the sensor mounting member has at least one recess between the neighboring contact fixing portions and the strain sensor is arranged in this recess.

3. The sensor equipped wheel support bearing assembly as claimed in claim 2, wherein the stationary member is the outer member.

4. The sensor equipped wheel support bearing assembly as claimed in claim 1, wherein the sensor unit comprises the mounting member made of the magnetostrictive material and the detecting coil, and the mounting member has at least one recess between the neighboring contact fixing portions and the detecting coil is arranged in this recess.

5. The sensor equipped wheel support bearing assembly as claimed in claim 4, wherein the stationary member is the outer member.

6. The sensor equipped wheel support bearing assembly as claimed in claim 4, wherein a first one of the contact fixing portions of the sensor mounting member is fitted at a location where it is deformed in a radial direction more than that at any other location of the stationary member by an external force acting on the stationary member or a working force acting between a wheel tire and the road surface.

7. The sensor equipped wheel support bearing assembly as claimed in claim 6, wherein a second one of the contact fixing portion is rendered to be a location where a direction of a radial strain caused by the external force acting on the stationary member or the working force acting between the wheel tire and the road surface is different oppositely.

8. The sensor equipped wheel support bearing assembly as claimed in claim 1, wherein the sensor unit comprises the sensor mounting member and the displacement sensor, and the contact fixing portions are fitted to respective locations, which is not deformed in the radial direction, as compared with at any other location of the stationary member, by the external force acting on the stationary member or the working force acting between the wheel tire and the road surface.

9. The sensor equipped wheel support bearing assembly as claimed in claim 8, wherein the displacement sensor is fitted to a location, which is deformed in the radial direction, as compared with at any other location of the stationary member, by the external force acting on the stationary member or the working force acting between the wheel tire and the road surface.

10. The sensor equipped wheel support bearing assembly as claimed in claim 8, wherein the stationary member is the outer member.

* * * * *

UNITED STATES PATENT AND TRADEMARK OFFICE
CERTIFICATE OF CORRECTION

PATENT NO. : 7,882,752 B2  
APPLICATION NO. : 12/086089  
DATED : February 8, 2011  
INVENTOR(S) : Takayoshi Ozaki et al.

It is certified that error appears in the above-identified patent and that said Letters Patent is hereby corrected as shown below:

Column 24, Line 58, in Claim 1, delete "at least" and insert -- at at least --, therefor.

Signed and Sealed this  
Thirty-first Day of May, 2011

David J. Kappos  
*Director of the United States Patent and Trademark Office*